US012661956B2

(12) United States Patent　　　　　(10) Patent No.: US 12,661,956 B2
Grotendorst et al.　　　　　　　　　(45) Date of Patent: Jun. 23, 2026

(54) HEATING AND COOLING MODULE, AND METHOD

(71) Applicant: Rheinmetall Invent GmbH, Neuss (DE)

(72) Inventors: Jorg Grotendorst, Nuremberg (DE); Karl-Heinz Hassel, Ostringen (DE)

(73) Assignee: Rheinmetall Invent GmbH, Neuss (DE)

( * ) Notice: Subject to any disclaimer, the term of this patent is extended or adjusted under 35 U.S.C. 154(b) by 162 days.

(21) Appl. No.: 18/565,250

(22) PCT Filed: May 16, 2022

(86) PCT No.: PCT/EP2022/063141
　　§ 371 (c)(1),
　　(2) Date: Nov. 29, 2023

(87) PCT Pub. No.: WO2022/258315
　　PCT Pub. Date: Dec. 15, 2022

(65) Prior Publication Data
　　US 2024/0239159 A1　　Jul. 18, 2024

(30) Foreign Application Priority Data
　　Jun. 9, 2021　(DE) ........................ 10 2021114840.5

(51) Int. Cl.
　　*B60H 1/32*　　　(2006.01)
　　*F25B 41/40*　　　(2021.01)
(52) U.S. Cl.
　　CPC ......... *B60H 1/3229* (2013.01); *B60H 1/3223* (2013.01); *F25B 41/40* (2021.01); *F25B 2300/00* (2013.01); *F25B 2400/21* (2013.01)

(58) Field of Classification Search
　　CPC ................ B60H 1/3229; B60H 1/3223; B60H 1/00571; F25B 41/40; F25B 2300/00; F25B 2400/21; F25B 41/31
　　See application file for complete search history.

(56) References Cited

U.S. PATENT DOCUMENTS

| | | | | |
|---|---|---|---|---|
| 3,276,739 | A | * 10/1966 | Freed | F16K 5/0264 |
| | | | | 251/368 |
| 2004/0182455 | A1* | 9/2004 | Wells | F16K 11/207 |
| | | | | 137/594 |
| 2016/0123640 | A1 | 5/2016 | Kil et al. | |

FOREIGN PATENT DOCUMENTS

| | | | | | |
|---|---|---|---|---|---|
| CN | | 1190722 | A | * 8/1998 | ................ F24F 1/20 |
| DE | 10 2010 004 294 | A1 | | 7/2011 | |
| DE | 11 2013 005 482 | T5 | | 8/2015 | |
| DE | 10 2019 211 701 | A1 | | 2/2020 | |
| DE | 10 2020 129 328 | A1 | | 5/2022 | |
| DE | 11 2020 004 318 | T5 | | 5/2022 | |
| DE | 10 2021 114 840 | A1 | | 12/2022 | |
| DE | 10 2021 133 850 | A1 | | 12/2022 | |
| EP | 2 963 358 | A1 | | 1/2016 | |
| JP | 2016-090201 | A | | 5/2016 | |

(Continued)

*Primary Examiner* — Kun Kai Ma
(74) *Attorney, Agent, or Firm* — Young Basile Hanlon & MacFarlane, P.C.

(57) ABSTRACT

A heating and cooling module (4A-4P) for a heating and cooling system (1A-1P), including a refrigerant circuit (7) through which a refrigerant (K) can be passed, and a refrigerant guiding block (6), wherein at least part of the refrigerant circuit (7) is integrated into a material (48) from which the refrigerant guiding block (6) is made.

17 Claims, 21 Drawing Sheets

(56)         References Cited

FOREIGN PATENT DOCUMENTS

| JP | 2019-215156 A | 12/2019 |
| KR | 2002-0001970 A | 1/2002 |
| WO | 2023/045358 A1 | 3/2023 |

* cited by examiner

HEATING AND COOLING MODULE, AND METHOD

CROSS-REFERENCE TO RELATED APPLICATION(S)

This application is filed pursuant to 35 U.S.C. § 371 claiming priority benefit to PCT/EP2022/063141 filed May 16, 2022, which claims priority benefit to German Patent Application 102021114840.5 filed Jun. 9, 2021, the contents of both applications are incorporated herein by reference in the entirety for all purposes.

TECHNICAL FIELD

The present invention relates to a heating and cooling module for a heating and cooling system and a method for operating such a heating and cooling module.

BACKGROUND

For components of air conditioning systems and heat pumps, a diffusion-tight and pressure-resistant connection is required. According to in-house findings, pipes made of metals, which usually form a closed circuit by means of soldered or welded joints and/or flanged joints in conjunction with sealing rings, can be used for this purpose.

However, this type of connection technology has only limited process reliability, as soldered connections, for example, are very dependent on the selected process parameters and are also very complex and require a large installation space. In addition, the number of joints increases the risk of leakage and thus the danger of releasing climate-damaging refrigerant into the surroundings.

SUMMARY

Against this background, one object of the present invention is to provide an improved heating and cooling module.

Accordingly, a heating and cooling module for a heating and cooling system is proposed. The heating and cooling module comprises a refrigerant circuit through which a refrigerant can be passed and a refrigerant guiding block, wherein at least a part of the refrigerant circuit is integrated into a material from which the refrigerant guiding block is made.

The fact that the refrigerant circuit is integrated directly into the material of the refrigerant guiding block, at least in sections, means that, compared with a refrigerant circuit constructed using a brazing process, for example, a more reliable production, a smaller size with greater power density and a high degree of flexibility, for example regarding the possible uses of the heating and cooling module, can be achieved. This creates a diffusion-closed refrigerant circuit with the lowest possible number of potential leakage points. Furthermore, the amount of refrigerant required can be reduced due to the elimination of external piping.

The heating and cooling module may be suitable for use in a building. In this case, the heating and cooling module may also be referred to as a building heating and cooling module. Alternatively, the heating and cooling module may be suitable for use in a motor vehicle, such as a passenger vehicle. In this case, the heating and cooling module may also be referred to as a vehicle heating and cooling module. The heating and cooling module may then be part of an air conditioning system of the vehicle, for example. The heating and cooling module may operate in both a heating mode and a cooling mode. Accordingly, the heating and cooling module may also be referred to as an air conditioning module.

The heating and cooling module is part of the heating and cooling system. Accordingly, a heating and cooling system comprising such a heating and cooling module is also proposed. The heating and cooling system may be used, for example, for a building or a vehicle. Therefore, the heating and cooling system may also be referred to as a building heating and cooling system or a vehicle heating and cooling system. The heating and cooling system may be an air conditioning system or part of an air conditioning system. The heating and cooling system may operate in either the heating mode or the cooling mode previously mentioned. Accordingly, the heating and cooling system may also be referred to as an air conditioning system. The heating and cooling system differs from the heating and cooling module, for example, by comprising additional components, such as external heat exchangers.

Preferably, the heating and cooling system or the heating and cooling module is a heat pump or part of a heat pump. A "heat pump" in this context means a machine that uses technical work to absorb thermal energy from a reservoir at a lower temperature, for example a surroundings, and—together with the drive energy—transfers it as useful heat to a system to be heated at a higher temperature, for example an interior of the building or the vehicle. Accordingly, the heating and cooling module can also be referred to as a heat pump heating and cooling module or a heat pump module.

In the present context, a "module" is preferably understood to mean a cuboid or box-shaped component that can be transported and assembled as a single unit. The heating and cooling module is thus preferably a transportable compact unit that can be carried by one person, for example. This allows the heating and cooling module to be used in a variety of ways. For example, several heating and cooling modules can be combined with each other.

A "refrigerant circuit" in this context means a device in which the refrigerant can circulate or through which the refrigerant can flow. The refrigerant circuit can be arranged completely inside the refrigerant guiding block. However, the refrigerant circuit can also be arranged at least partially outside the refrigerant guiding block. The refrigerant circuit is implemented, for example, with the aid of cavities, recesses, grooves, bores or the like introduced into the refrigerant guiding block or into the material.

For example, the refrigerant circuit includes refrigerant lines that may be at least partially routed within the refrigerant guiding block. Furthermore, the refrigerant circuit may also comprise switch valves integrated in the refrigerant guiding block, a switch valve unit, expansion valves, bypass valves, a compressor, filters, a recycling unit, several heat exchangers and/or any other arbitrary components of a heat pump. The aforementioned components may also be referred to more generally as "components" of the refrigerant circuit or heating and cooling module.

For example, the refrigerant can be 1,1,1,2-tetrafluoroethane (R-134a), carbon dioxide (R744), or any other suitable refrigerant. During operation of the heating and cooling module, the refrigerant flows through the refrigerant circuit. A "refrigerant" transports enthalpy from a refrigerant to the surroundings. The difference between this and a "coolant" is that a refrigerant in a refrigeration circuit is capable of transporting enthalpy along a temperature gradient, such that, with the expenditure of supplied energy, the ambient temperature may even be higher than the temperature of the item being cooled, whereas a coolant is only capable of transporting enthalpy in a refrigeration circuit against the temperature gradient to a point of lower temperature. An example of a coolant is water.

The refrigerant guiding block is block-shaped or plate-shaped. "Block-shaped" as used herein means that the refrigerant guiding block is cuboid-shaped or box-shaped. "Plate-shaped" means that a thickness of the refrigerant guiding block is significantly smaller than a width dimension and a depth dimension thereof. Particularly preferably, the refrigerant guiding block is plate-shaped. Therefore, the refrigerant guiding block may also be referred to as a refrigerant guiding plate. That is, the terms "refrigerant guiding block" and "refrigerant guiding plate" may be interchanged as desired.

The refrigerant guiding block routes or guides the refrigerant during operation of the heating and cooling module. The refrigerant guiding block may also be referred to as a refrigerant routing block or a refrigerant routing plate. This means that the terms "refrigerant guiding block", "refrigerant routing block" and "refrigerant routing plate" can be interchanged as desired.

The material or substance from which the refrigerant guiding block is made may include, for example, an aluminum alloy, a magnesium alloy, or any other metallic material. Preferably, the material is a light metal. However, for example, the material may also be a copper alloy or a steel alloy. However, for weight reasons, an aluminum alloy or a magnesium alloy is preferred. However, the material may also be a plastic material or a ceramic material. Particularly preferably, however, the material is a metallic material.

The material may also be referred to as substance. Further, the material may also be referred to as refrigerant guiding block material. The refrigerant guiding block may be made of exactly one material throughout. Alternatively, the refrigerant guiding block may be made of several different materials. That is, different materials may be combined to make the refrigerant guiding block.

In the present case, the fact that the refrigerant circuit is "integrated" or "embedded" into the material means in particular that the refrigerant circuit, for example one of the previously mentioned refrigerant lines of the refrigerant circuit, is integrated or embedded into the block-shaped material, preferably by a material-removing process, such as drilling, milling or eroding, in the form of a cavity, recess, bore or groove. However, the refrigerant circuit can also be "integrated into" or "embedded into" the refrigerant guiding block by "building up" the refrigerant guiding block around the refrigerant circuit in an additive or generative manufacturing process, in particular in a 3D printing process.

"Integrated" further means in particular that the refrigerant circuit is at least partially formed as a cavity provided in the material. In particular, the refrigerant circuit is directly integrated into the material. This means that no additional components, such as pipes, run through the refrigerant guiding block to guide the refrigerant. This also means that the refrigerant can come into direct contact with the material during operation of the heating and cooling module. However, this does not preclude the refrigerant circuit, for example the previously mentioned refrigerant line, from being coated on the inside, at least in sections, with a coating, for example with a corrosion-inhibiting coating.

According to one embodiment, the refrigerant guiding block is an integral component, in particular a one-piece material component.

"Integral" or "one-piece" in this context means that the refrigerant guiding block is not composed of different components but is manufactured as a single component. "One-piece material" or "monolithic" in this context means that the refrigerant guiding block is made throughout of the same material, namely the aforementioned material. However, this does not preclude the refrigerant guiding block from comprising a cover or other openable and closable maintenance openings. The refrigerant guiding block may also be referred to as a monoblock or a refrigerant guiding monoblock in the event that it is in one piece.

The refrigerant circuit itself can be integrated into the refrigerant guiding block, for example, by drilling, milling, eroding or other ablative machining processes. Furthermore, as mentioned previously, the refrigerant guiding block can also be "built around" the refrigerant circuit using an additive or generative manufacturing process, in particular a 3D printing process. For example, a powdered metallic or ceramic material can be used for this purpose. A plastic material can also be used.

The refrigerant guiding block can also be a cast component, in which case the refrigerant circuit can be realized by means of inserted cores which are removed after completion of the refrigerant guiding block, namely after the latter has been cast. Openings or bores in the refrigerant guiding block which are not functionally required for manufacturing purposes can be welded or soldered shut or otherwise sealed in a fluid-tight manner.

According to another embodiment, the refrigerant guiding block is at least in two parts and comprises a lower part and an upper part firmly connected to the lower part.

The refrigerant guiding block can basically comprise any number of individual parts. Dividing the refrigerant guiding block into two parts has the advantage that larger components of the refrigerant circuit, such as a heat exchanger, can also be integrated into the refrigerant guiding block. For example, the refrigerant circuit is integrated into the lower part in the form of channels using a milling process. The lower part is then closed with the aid of the upper part and firmly connected to it.

Preferably, the lower part is joined to the upper part by a material bond. In the case of materially bonded connections, the connecting partners are held together by atomic or molecular forces. Materially bonded connections are non-detachable connections that can only be separated from each other by destroying the connecting means and/or the connecting partners. This means that the lower part and the upper part of the refrigerant guiding block can no longer be separated from each other without being destroyed. For example, the lower part and the upper part are soldered or welded together in a fluid-tight manner.

Furthermore, the integral and the two-piece or multi-part design of the refrigerant guiding block can also be used in combination with each other. For example, in the area of the previously mentioned refrigerant lines, the refrigerant guiding block can be designed integral, in particular one-piece material, whereas in the area of switch valves, for example, the refrigerant guiding block is designed as a two-piece block with a lower part and an upper part to allow good accessibility to the switch valves. The upper part can also be a removable maintenance cover through which, for example, a replaceable filter can be accessed.

According to another embodiment, the refrigerant circuit comprises a compressor arranged at least partially within the refrigerant guiding block.

For example, the refrigerant guiding block forms part of a compressor housing of the compressor. The compressor may also be referred to as a compactor. Preferably, the compressor comprises a compressor geometry driven by a motor. For example, the compressor geometry may include compressor blades or a piston. For example, the compressor geometry is disposed within the refrigerant guiding block. For this purpose, a corresponding cavity or recess is provided in the refrigerant guiding block for the compressor geometry.

Electronic components, valves, switches or the like of the compressor can also be arranged within the refrigerant guiding block and thus integrated into it. The motor of the compressor can also be placed at least in sections within the refrigerant guiding block. By integrating the compressor at least in sections into the refrigerant guiding block, it is advantageous to dispense with piping between the compressor and the refrigerant guiding block.

According to another embodiment, the refrigerant circuit comprises a throttle valve which is arranged within the refrigerant guiding block and is at least partially integrated into the material.

The throttle valve may also be referred to as an expansion valve. The refrigerant circuit preferably comprises at least one throttle valve. However, the refrigerant circuit may also comprise several throttle valves, for example two throttle valves. The throttle valve may, for example, be elaborated as a constriction or narrowing of one of the refrigerant lines integrated into the material of the refrigerant guiding block.

The throttle valve can have a bypass valve associated with it, which can be used to bypass the refrigerant around the throttle valve. This may be necessary if the direction of flow of the refrigerant in the refrigerant circuit is reversed. The bypass valve may also be integrated into the material. Preferably, the bypass valve is a switch valve. For example, a movable valve body of the bypass valve is provided in a corresponding recess or cavity machined into the refrigerant guiding block.

According to another embodiment, the refrigerant circuit comprises switch valves and/or a switch valve unit for reversing a flow direction of the refrigerant in the refrigerant circuit, the switch valves and/or the switch valve unit being arranged within the refrigerant guiding block and are at least partially integrated into the material.

The number of switch valves is arbitrary. For example, four such switch valves are provided. The switch valves can be open-close valves. That is, the switch valves may be either fully open or fully closed. The switch valves have, for example, movable valve bodies that are received in corresponding recesses or cavities that are made or machined into the material of the refrigerant guiding block. The switch valve unit can replace the switch valves. By using the switch valve unit, the number of valves required can be reduced compared to the use of switch valves.

According to another embodiment, the refrigerant circuit comprises at least one heat exchanger which is arranged within the refrigerant guiding block and is at least partially integrated into the material.

The heat exchanger may also be referred to as a heat transferrer. For example, heat exchanger plates of the respective heat exchanger are accommodated in a cavity or recess of the refrigerant guiding block. Here, it is particularly advantageous if the refrigerant guiding block is designed in two parts. In this case, the heat exchanger plates can, for example, be inserted into the lower part, which is then closed and soldered or welded to the upper part.

The refrigerant circuit may comprise several heat exchangers. Preferably, there is one heat exchanger that operates as an evaporator and one heat exchanger that operates as a condenser. By reversing the direction of flow of the refrigerant, the functionality of the heat exchangers can be reversed. The condenser and evaporator may be located outside the refrigerant guiding block. Further, the refrigerant circuit may also include an internal heat exchanger that allows heat exchange between refrigerant lines within the refrigerant guiding block. This may increase the efficiency of the heating and cooling module.

According to another embodiment, the refrigerant circuit comprises refrigerant lines which are guided at least partially through the refrigerant guiding block and are at least partially integrated into the material.

The refrigerant lines can also be referred to as refrigerant channels. As previously mentioned, the refrigerant lines can be machined into the material of the refrigerant guiding block, for example as holes or grooves, in an ablative manufacturing process. The refrigerant lines can run partly outside and partly inside the refrigerant guiding block.

According to another embodiment, the refrigerant guiding block comprises a gap, in particular an air gap, which is integrated into the material and is placed between adjacent refrigerant lines in order to thermally decouple the refrigerant lines from each other.

The gap can also be referred to as a slot or groove. Because the gap is air-filled, it has a very low thermal conductivity compared to the material of the refrigerant guiding block. The fact that the refrigerant lines are "thermally" decoupled from one another means that heat transfer between the refrigerant lines within the refrigerant guiding block is prevented or at least reduced. The refrigerant guiding block may have a plurality of such gaps. For example, each refrigerant line can be assigned a pair of gaps between which the respective refrigerant line is arranged.

With the aid of the gap or gaps, it is also possible to thermally decouple, or separate other components of the refrigerant circuit already mentioned above, such as throttle valves, switch valves, the switch valve unit, heat exchangers, the compressor or any other components or parts of the refrigerant circuit. Accordingly, the refrigerant guiding block comprises a gap, in particular an air gap, integrated into the material and placed between adjacent components of the refrigerant circuit to thermally decouple the components from each other. Thermal decoupling of the respective component from the refrigerant guiding block can also be achieved.

According to another embodiment, the gap extends partially or completely through the refrigerant guiding block in a height direction of the refrigerant guiding block.

The height direction may also be referred to as the thickness direction. Preferably, the refrigerant guiding block comprises an upper side and a bottom side facing away from the upper side. The gap may extend into the refrigerant guiding block from the upper side toward the bottom side. Conversely, the gap may also extend into the refrigerant guiding block from the bottom side toward the upper side. In the case where the gap extends completely through the refrigerant guiding block, the latter connects the upper side to the bottom side. In the latter case, the best thermal decoupling is achieved. The gap can be milled into the refrigerant guiding block, for example. Furthermore, the gap can also be produced using an eroding process.

According to another embodiment, the gap is at least partially filled with an insulating material, in particular with a foamed plastic material.

The insulating material has a lower thermal conductivity than the material of the refrigerant guiding block. This further improves thermal decoupling. The insulating material can be, for example, a polyurethane foam (PU), which is introduced in liquid form into the gap, where it foams and hardens and/or cross-links. Preferably, the insulating material is a foam or comprises pores that can be closed or open.

The insulating material can also be an injection-molded plastic component that is glued and/or inserted into the gap.

According to another embodiment, at least one of the refrigerant lines is opened towards the gap, wherein an insulating element, in particular a plastic component, is accommodated within the gap and seals the at least one refrigerant line fluid-tightly with respect to the gap.

This further improves thermal decoupling. A material from which the insulating element is made has a lower thermal conductivity than the material of the refrigerant guiding block. In the present case, the fact that the refrigerant line is "opened" towards the gap means that the refrigerant line, in particular an inner wall of the refrigerant line, is interrupted so that the refrigerant pours into the gap in the event that the insulating element is not accommodated in the gap. The insulating element thus becomes part of the refrigerant line, in particular the inner wall of the refrigerant line.

The insulating element can also be used for thermal decoupling of the previously mentioned further components of the refrigerant circuit, such as the throttle valves, the switch valves, the switch valve unit, the heat exchangers or any other components and parts of the refrigerant circuit. The insulating element is preferably an injection-molded plastic component. Suitable plastic materials include, for example, polyethylene (PE), polypropylene (PP), acrylonitrile-butadiene-styrene (ABS), polyoxymethylene (POM), polyetheretherketone (PEEK) or other suitable thermoplastics. The insulating element can be glued or welded into the gap.

According to another embodiment, the insulating element comprises a diffusion-tight coating, in particular a metallic coating, at least on the refrigerant side.

In this case, "on the refrigerant side" means facing the refrigerant. "Diffusion-tight" means that the coating prevents diffusion of the refrigerant into the insulating element. For example, the coating can be a chromium layer, nickel layer, gold layer, silver layer, copper layer or the like. It is also possible to coat the entire insulating element.

A method of operating such a heating and cooling module for a heating and cooling system is also proposed. The method comprises the steps of: a) passing a refrigerant through a refrigerant circuit of the heating and cooling module, wherein at least a part of the refrigerant circuit is integrated into a material from which a refrigerant guiding block of the heating and cooling module is made, so that the refrigerant flows through the refrigerant guiding block, and b) transferring heat by means of the refrigerant.

Steps a) and b) are preferably carried out simultaneously. Preferably, in step b), heat is transferred from a surroundings to an interior of a building or motor vehicle in a heating mode of the heating and cooling module. However, the method also enables a cooling mode in which heat is transferred from the interior to the surroundings. In this case, the heating and cooling module is a heat pump or part of a heat pump. When flowing through the refrigerant guiding block, the refrigerant comes into direct contact in particular with the material of the refrigerant guiding block. However, this does not rule out the possibility that the refrigerant circuit is coated at least in sections on the refrigerant side.

According to one embodiment, in step a) and/or in step b), thermal decoupling of refrigerant lines of the refrigerant circuit provided in the refrigerant guiding block is achieved by at least one gap being provided in the refrigerant guiding block.

The gap interrupts or impedes undesired heat transfer between the refrigerant lines. This is advantageous in that the efficiency of the method can be increased, as uniform heating of the refrigerant guiding block is prevented. The gap may be filled with the insulating material, as mentioned previously. The previously mentioned insulating element may also be received in the gap. This further improves thermal decoupling.

As previously mentioned, any number of gaps may be provided. Thermal decoupling using the gap or using the gaps can be used for any other components of the refrigerant circuit, such as throttle valves, switch valves, the switch valve unit, heat exchangers, the compressor or any other arbitrary components or parts of the refrigerant circuit, as mentioned before.

The embodiments and features described for the proposed heating and cooling module apply accordingly to the proposed method.

In the present context, "one" is not necessarily to be understood as being limited to exactly one element. Rather, several elements, such as two, three or more, may also be provided. Also, any other counting word used herein is not to be understood as limiting to exactly the number of elements mentioned. Rather, numerical deviations upwards and downwards are possible, unless otherwise indicated.

Further possible implementations of the heating and cooling module and/or the method also include combinations of features or embodiments described before or below with respect to the embodiments that are not explicitly mentioned. In this context, the skilled person will also add individual aspects as improvements or additions to the respective basic form of the heating and cooling module and/or the method.

Further advantageous embodiments and aspects of the heating and cooling module and/or the method are the subject of the subclaims as well as the embodiments of the heating and cooling module and/or the method described below.

BRIEF DESCRIPTION OF THE DRAWINGS

In the following, the heating and cooling module and/or the method are explained in more detail on the basis of preferred embodiments with reference to the accompanying figures.

DETAILED DESCRIPTION

In the figures, identical or functionally identical elements have been given the same reference signs unless otherwise indicated.

Figure 1:
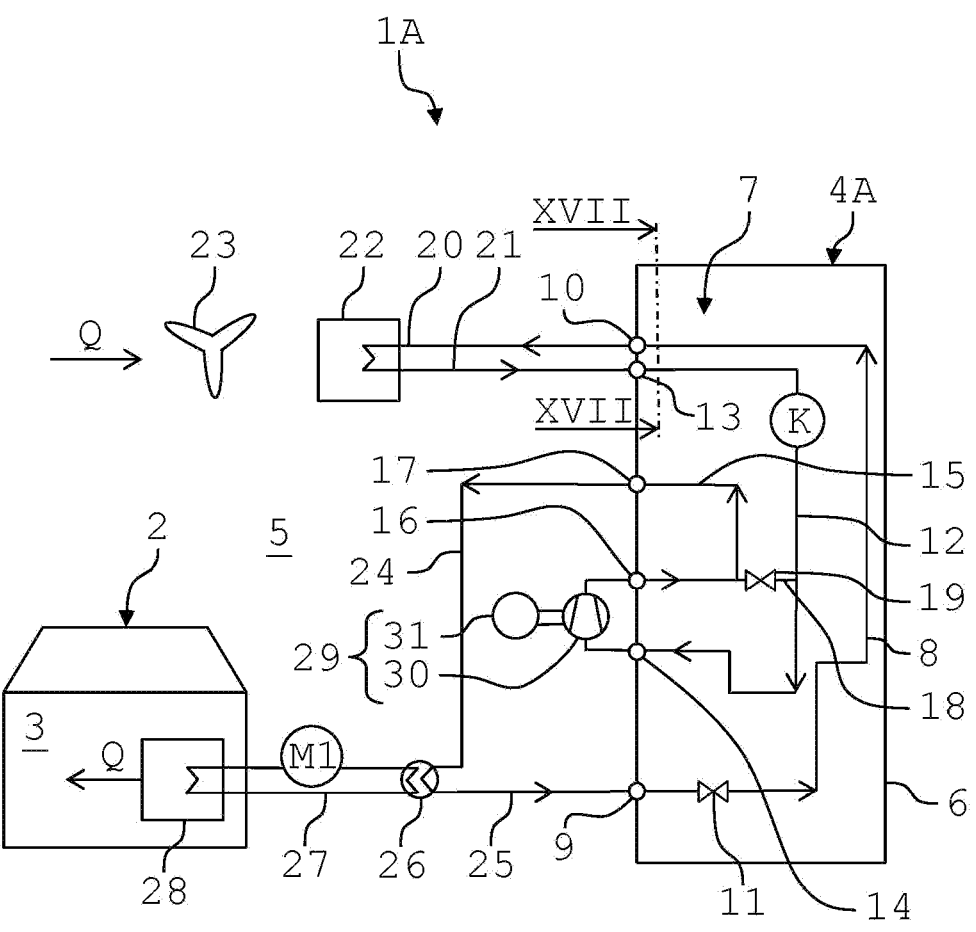
FIG. 1 shows a schematic view of one embodiment of a heating and cooling system.

FIG. 1 shows a schematic view of one embodiment of a heating and cooling system 1A for a building 2. The heating and cooling system 1A may therefore be referred to as a building heating and cooling system. The building 2 may be, for example, a residential building, in particular a single-family house or multi-family house, or an office building. The heating and cooling system 1A is adapted to heat and cool an interior 3 of the building 2. The heating and cooling system 1A may therefore also be referred to as an air conditioning system.

However, the heating and cooling system 1A may also be applied to a vehicle (not shown), in particular a motor vehicle. In this case, the heating and cooling system 1A may be referred to as a vehicle heating and cooling system. The heating and cooling system 1A may be an air conditioning system or part of an air conditioning system of the vehicle.

The heating and cooling system 1A comprises a compact heating and cooling module 4A that may be arranged outside the building 2, that is, in a surroundings 5 thereof, or in the interior 3 of the building 2. The heating and cooling module 4A may also be referred to as an air conditioning module.

In case the heating and cooling module 4A is applied to a building 2, it may also be referred to as a building heating and cooling module. In case the heating and cooling module

4A is applied to a vehicle, it may also be referred to as a vehicle heating and cooling module.

The heating and cooling module 4A comprises a refrigerant routing block or refrigerant guiding block 6, in which a refrigerant circuit 7 is realized by means of bores, channels, cavities or the like, in which a refrigerant K circulates. The refrigerant K can be 1,1,1,2-tetrafluoroethane (R-134a) or any other suitable refrigerant.

A "refrigerant" transports enthalpy from an object to be cooled to the surroundings 5. The difference to a "coolant" is that a refrigerant in a refrigerant circuit is able to transport enthalpy along a temperature gradient, so that the surroundings temperature may even be higher than the temperature of the object to be cooled, while a coolant is only able to transport enthalpy in a coolant circuit against the temperature gradient to a location of lower temperature.

The refrigerant guiding block 6 can be plate-shaped or cuboid-shaped. The refrigerant guiding block 6 can be made of an aluminum alloy or a magnesium alloy, for example. However, the refrigerant guiding block 6 may also be made of a copper alloy. The refrigerant guiding block 6 is preferably an integral component, in particular a one-piece material component. However, the refrigerant guiding block 6 can also be multi-part.

"Integral" or "one-piece" in this context means that the refrigerant guiding block 6 is not composed of different components but is manufactured as a single component. "One-piece material" or "monolithic" in this context means that the refrigerant guiding block 6 is made of the same material throughout, for example an aluminum alloy. However, this does not preclude the refrigerant guiding block 6 from comprising a cover or other openable and closable maintenance openings.

The refrigerant circuit 7 itself can be integrated into the refrigerant guiding block 6, for example, by drilling, milling, eroding or other ablative machining methods. In this way, a diffusion-closed refrigerant circuit 7 is created with the lowest possible number of potential leakage points.

Furthermore, the refrigerant guiding block 6 can also be built "around" the refrigerant circuit 7 using an additive or generative manufacturing method, in particular 3D printing. The refrigerant guiding block 6 can also be a cast component, whereby the refrigerant circuit 7 can be realized by inserted cores which are removed after completion of the refrigerant guiding block 6.

By functionally incorporating essential refrigerant-carrying cavities of the refrigerant circuit 7 into the solid refrigerant guiding block 6, the joining techniques required to close the refrigerant circuit 7 can be significantly reduced compared to conventional piping.

The refrigerant guiding block 6 can thus be used to achieve lower leakage of the refrigerant K, more process-reliable production compared to brazing methods, a smaller size with higher power density, and a high degree of flexibility, for example regarding the possible applications of the heating and cooling module 4A.

By reducing the number of detachable connections, a hermitized refrigerant circuit 7 with low refrigerant diffusion and increased ease of assembly can be achieved with a small size. This results in a reduction in the marketing of environmentally hazardous substances, such as refrigerant K, with a high greenhouse potential.

Preferably, the refrigerant circuit 7 realized in the refrigerant guiding block 6 also comprises—as will be explained further below—valves or valve devices which, depending on different operating modes of the heating and cooling module 4A, can guide the refrigerant K into different cavities and thus reverse a flow direction of the refrigerant K and thus represent, for example, a circuit reversal or also an exchange circuit. Valve bodies of these valves can be pressed or glued into the refrigerant guiding block 6, although a detachable connection technique can also be used for ease of maintenance.

Furthermore, other functional assemblies such as a buffer tank, a dryer or even a sight glass can be integrated into the refrigerant guiding block 6. These can be functionally integrated into the refrigerant guiding block 6 completely in the form of a further cavity or in the form of an assembly attached to the refrigerant guiding block 6.

Furthermore, a cavity can also be provided in the refrigerant guiding block 6 as a buffer store, which can include a filter and/or a desiccant. Usually, such desiccants are changed at defined service intervals. In order to be able to carry this out, it makes sense to provide a detachable connection for this purpose, which allows access to this aforementioned cavity and enables the desiccant to be replaced as part of the service activities.

Furthermore, electronics required to control the valves and, if necessary, a compressor, as well as the necessary sensor technology, such as temperature and/or pressure sensors, can also be integrated into the refrigerant guiding block 6.

Depending on demand, heat exchangers of the heating and cooling system 1A can be designed as refrigerant-air heat exchangers, refrigerant-water heat exchangers or refrigerant-brine heat exchangers as desired, depending on a respective heat source and heat sink used. It is also possible to integrate the aforementioned compressor at least partially into the refrigerant guiding block 6.

The refrigerant circuit 7 implemented in the refrigerant guiding block 6 comprises a refrigerant line 8, for example in the form of a bore in the refrigerant guiding block 6, which supplies refrigerant from an interface 9 provided on the refrigerant guiding block 6 to an interface 10 provided on the refrigerant guiding block 6. The interfaces 9, 10 can, for example, be flanges or connecting pieces to which tubes or pipes can be attached.

The refrigerant line 8 includes an expansion valve or throttle valve 11 integrated into the refrigerant guiding block 6. The throttle valve 11 may be a throttle, i.e., a restriction or throttle provided on the refrigerant line 8 for expansion of the refrigerant K. The throttle valve 11 may have flow in only one direction or in two directions.

A further refrigerant line 12 provided in the refrigerant guiding block 6 leads from an interface 13 to an interface 14 of the refrigerant guiding block 6. A refrigerant line 15 leads from an interface 16 to an interface 17. A refrigerant line 18 realized in the refrigerant guiding block 6 fluidically connects the refrigerant lines 12, 15 with each other. The refrigerant line 18 comprises a valve 19, in particular a switch valve, which is also arranged in the refrigerant guiding block 6.

A heat exchanger 22, in particular an air-refrigerant heat exchanger, which is also arranged outside the refrigerant guiding block 6, is connected to the interfaces 10, 13 by means of refrigerant lines 20, 21. The refrigerant lines 20, 21 can be pipes or tubes. The refrigerant lines 20, 21 are flanged to the interfaces 10, 13. A ventilator or fan 23 is associated with the heat exchanger 22. The fan 23 may force air flow to provide improved heat exchange.

A heat exchanger 26 is connected to the interfaces 9, 17 by means of refrigerant lines 24, 25. The refrigerant lines 24, 25 and the heat exchanger 26 are arranged outside the refrigerant guiding block 6. The refrigerant lines 24, 25 can be tubes or pipes. The refrigerant lines 24, 25 are flanged to the interfaces 9, 17. The heat exchanger 26 is preferably a refrigerant-heat carrier medium heat exchanger, in particular a refrigerant-water heat exchanger.

The heat exchanger 26 is suitable for transferring heat Q from the refrigerant circuit 7 to a heat carrier medium circuit 27 and vice versa. A heat carrier medium M1, for example water, circulates in the heat carrier medium circuit 27. The heat carrier medium M1 is a coolant. In addition to the heat exchanger 26, the heat carrier medium circuit 27 comprises a heat exchanger 28 arranged in the interior 3 of the building 2. The heat exchanger 28 is a heat carrier medium-air heat exchanger. The heat exchanger 28 may be a heater or radiator.

A compactor or compressor 29 for compressing the refrigerant K is connected to the interfaces 14, 16. The compressor 29 is placed completely outside the refrigerant guiding block 6. However, as previously mentioned, the compressor 29 may also be at least partially integrated into the refrigerant guiding block 6. The compressor 29 comprises a compressor geometry 30 and a motor 31, in particular an electric motor, for driving the compressor geometry 30. The compressor geometry 30 may comprise compressor blades or a piston.

The functionality of the heating and cooling system 1A in a heating mode is explained below. The heating and cooling system 1A functions as a heat pump, in particular as an air-to-water heat pump. By suitably combining the heat exchangers 22, 26, 28, for example by using two refrigerant-liquid heat exchangers, a water-water heat pump can be represented, or by combining two refrigerant-air heat exchangers, an air-air heat pump can be represented.

A "heat pump" is understood to be a machine which, with the use of technical work, takes thermal energy from a reservoir with a lower temperature, in this case the surroundings 5, and—together with the drive energy—transfers it as useful heat to a system to be heated with a higher temperature, in this case the interior 3 of the building 2.

The heat exchanger 22 absorbs heat Q from the surroundings 5. The heat exchanger 22 works as an evaporator to at least partially evaporate the refrigerant K. The refrigerant K absorbs heat Q from the environment 5. The refrigerant K absorbs the heat Q in the process. The refrigerant K is cold, has a low pressure and is at least partially gaseous. This refrigerant K is supplied to the compressor 29 via the refrigerant lines 12, 21 and compressed. Downstream of the compressor 29, the refrigerant K has a high temperature and a high pressure and is at least partially gaseous.

The refrigerant K is then supplied to the heat exchanger 26 via the refrigerant lines 15, 24. The heat exchanger 26 acts as a condenser. The gaseous refrigerant K condenses in the heat exchanger 26 and gives off heat Q to the heat carrier medium circuit 27. Downstream of the heat exchanger 26, the refrigerant K is liquid, has a high pressure and is warm.

The refrigerant K is thus supplied via the refrigerant lines 8, 25 to the throttle valve 11, where the pressure is reduced. Downstream of the throttle valve 11, the refrigerant K is liquid, has a low pressure and is very cold. The refrigerant K is again supplied via the refrigerant lines 8, 20 to the heat exchanger 22, where it again absorbs heat Q.

The heat Q transferred to the heat carrier medium circuit 27 is transferred to the interior 3 by means of the heat exchanger 28 in order to heat it. For cooling the interior 3, the method explained above can be reversed. The heating and cooling system 1A is then in a cooling mode.

Figure 2:
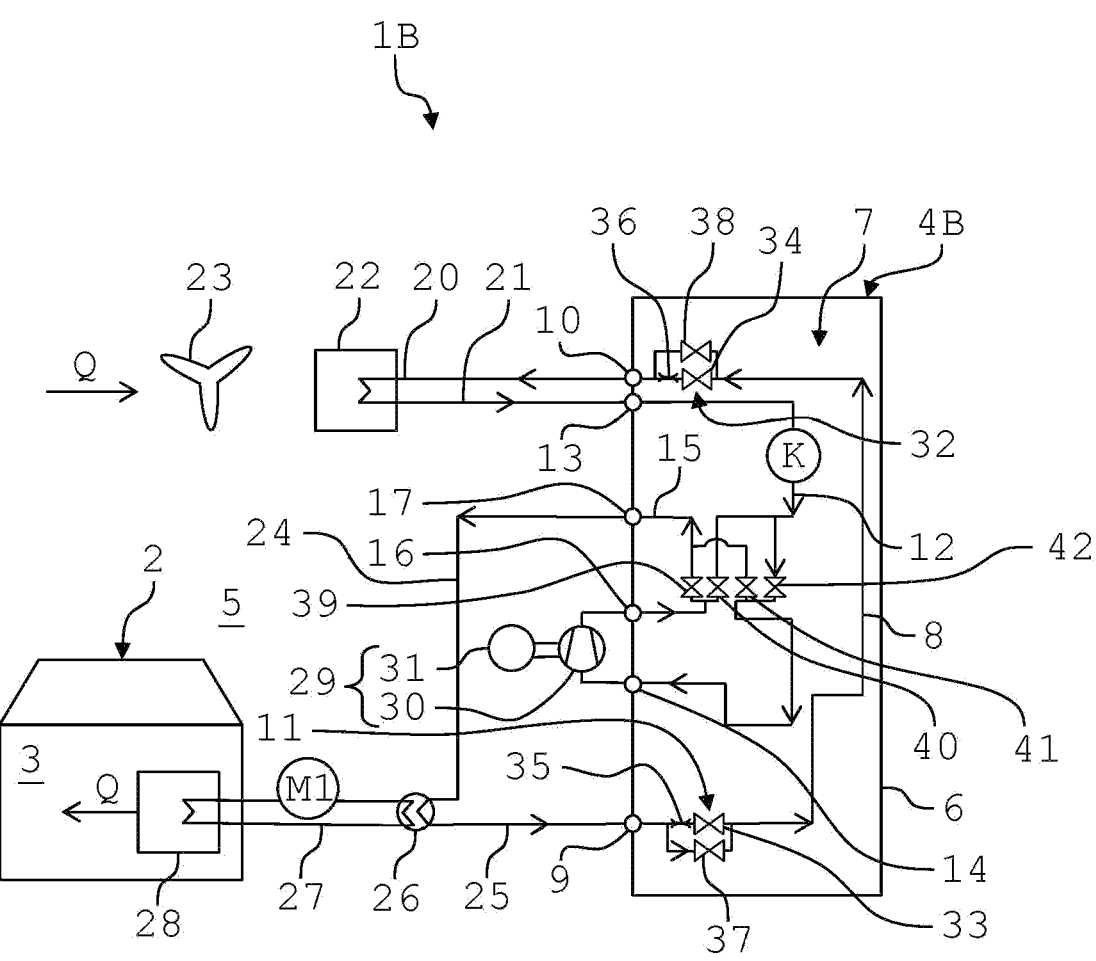
FIG. 2 shows a schematic view of another embodiment of a heating and cooling system.

FIG. 2 shows a schematic view of another embodiment of a heating and cooling system 1B. The heating and cooling system 1B differs from the heating and cooling system 1A by an alternative design of the heating and cooling module 4B.

In the heating and cooling module 4B according to FIG. 2, the refrigerant guiding block 6 comprises, in addition to the throttle valve 11, a further expansion valve or throttle valve 32 which, like the throttle valve 11, is assigned to the refrigerant line 8. Both throttle valves 11, 32 are located at least partially within the refrigerant guiding block 6. The throttle valves 11, 32 can each be traversed in only one direction. Each throttle valve 11, 32 comprises a check valve 33, 34 and a throttle 35, 36.

A bypass valve 37 is assigned to the throttle valve 11. A bypass valve 38 is assigned to the throttle valve 32. The bypass valves 37, 38 are arranged inside the refrigerant guiding block 6. With the aid of the bypass valves 37, 38 it is possible to bypass the respective throttle valve 11, 32 and thus to route the refrigerant K around the corresponding throttle valve 11, 32.

The refrigerant guiding block 6 further comprises switch valves 39 to 42, by means of which a reversal of a flow direction of the refrigerant K in the refrigerant circuit 7 is possible. Through this, the heating and cooling system 1B can be switched from the heating mode to the cooling mode, or the heat exchanger 22 can be defrosted. For example, movable valve bodies of the switch valves 39 to 42 are received in corresponding holes of the refrigerant guiding block 6.

The functionality of the heating and cooling system 1B in heating mode is explained below. The heating and cooling system 1B operates in essentially the same way as the previously explained heating and cooling system 1A.

The switch valves 39, 42 are open. The switch valves 40, 41 are closed. The bypass valve 37 is open. The bypass valve 38 is closed. The heat exchanger 22 absorbs heat Q from the surroundings 5. The heat exchanger 22 thereby operates as an evaporator in order to at least partially evaporate the refrigerant K. The refrigerant K absorbs the heat Q in the process.

The refrigerant K is cold, has a low pressure and is at least partially gaseous. This refrigerant K is supplied to the compressor 29 via the refrigerant lines 12, 21 and the switch valve 42 and compressed. Downstream of the compressor 29, the refrigerant K has a high temperature and a high pressure and is at least partially gaseous.

The refrigerant K is supplied to the heat exchanger 26 downstream of the compressor 29 via the refrigerant line 15, the switch valve 39 and the refrigerant line 24. The heat exchanger 26 acts as a condenser. The gaseous refrigerant K condenses in the heat exchanger 26 and gives off heat Q to the heat carrier medium circuit 27.

Downstream of the heat exchanger 26, the refrigerant K is liquid, has a high pressure and is warm. The refrigerant K is supplied to the throttle valve 32 via the bypass valve 37 and the refrigerant lines 8, 25, where the pressure is reduced by means of the throttle valve 32.

Downstream of the throttle valve 32, the refrigerant K is liquid, has a low pressure and is very cold. The refrigerant K is supplied again to the heat exchanger 22 via the refrigerant line 20, where it absorbs heat Q again.

For cooling the interior 3, the method explained above can be reversed. The heating and cooling system 1B is then in cooling mode. For this purpose, the switch valves 39, 42 are closed and the switch valves 40, 41 are opened. Furthermore, the bypass valve 37 is closed and the bypass valve 38 is opened. The expansion of the refrigerant K then takes place with the aid of the throttle valve 11.

Figure 3:
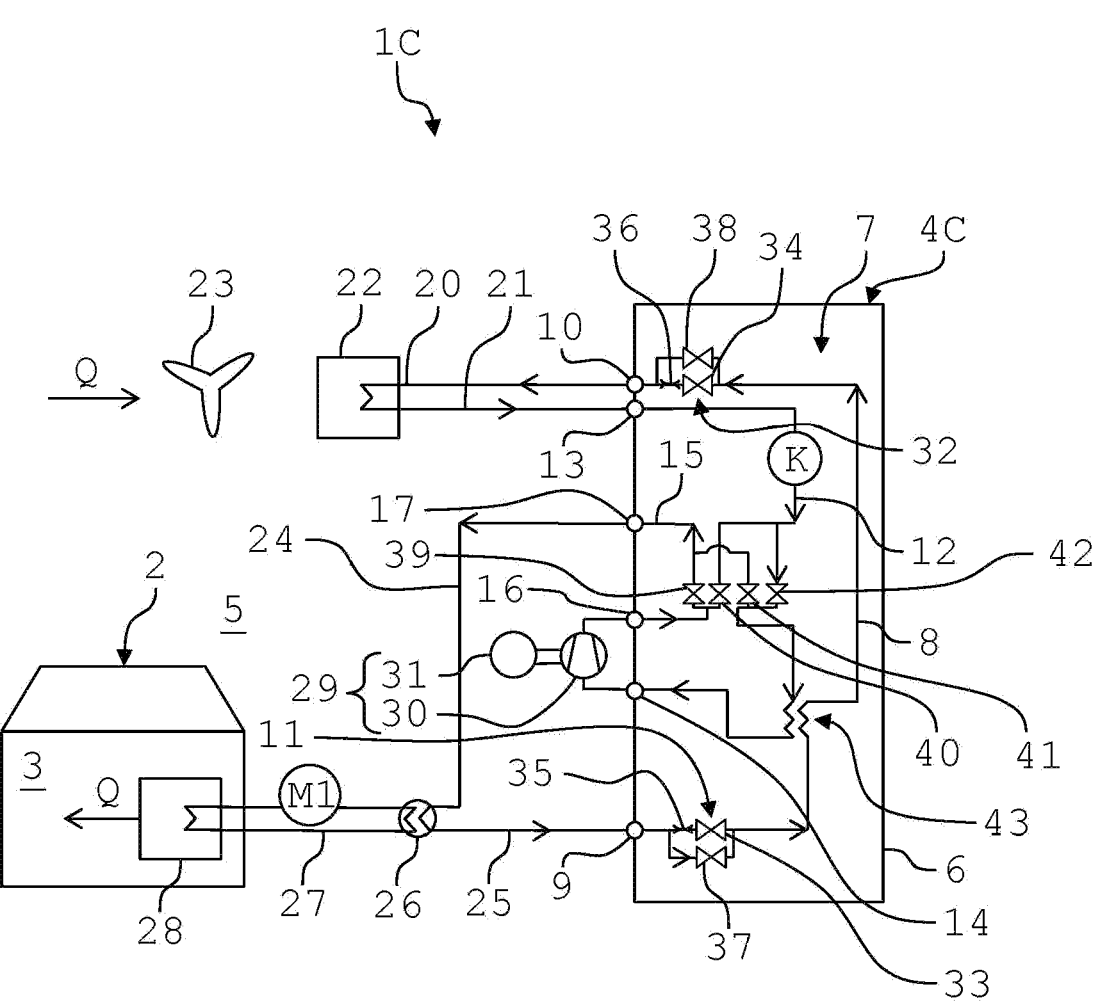
FIG. 3 shows a schematic view of another embodiment of a heating and cooling system.

FIG. 3 shows a schematic view of another embodiment of a heating and cooling system 1C. The heating and cooling system 1C differs from the heating and cooling system 1B by an alternative design of the heating and cooling module 4C.

In the heating and cooling module 4C according to FIG. 3, an internal heat exchanger 43 is integrated in the refrigerant guiding block 6 to enable heat exchange between the refrigerant line 8 and the refrigerant line 12. For this purpose, the refrigerant lines 8, 12 are meandered in the area of the heat exchanger 43 and interlock in a finger-like or comb-like manner.

For example, in the heating mode it is thus possible to transfer heat Q from the refrigerant K flowing through the refrigerant line 8 to the heat exchanger 22 to the refrigerant K flowing through the refrigerant line 12 to the compressor 29. This increases the efficiency. The functionality of the heating and cooling system 1C is otherwise the same as that of the heating and cooling system 1B.

Figure 4:
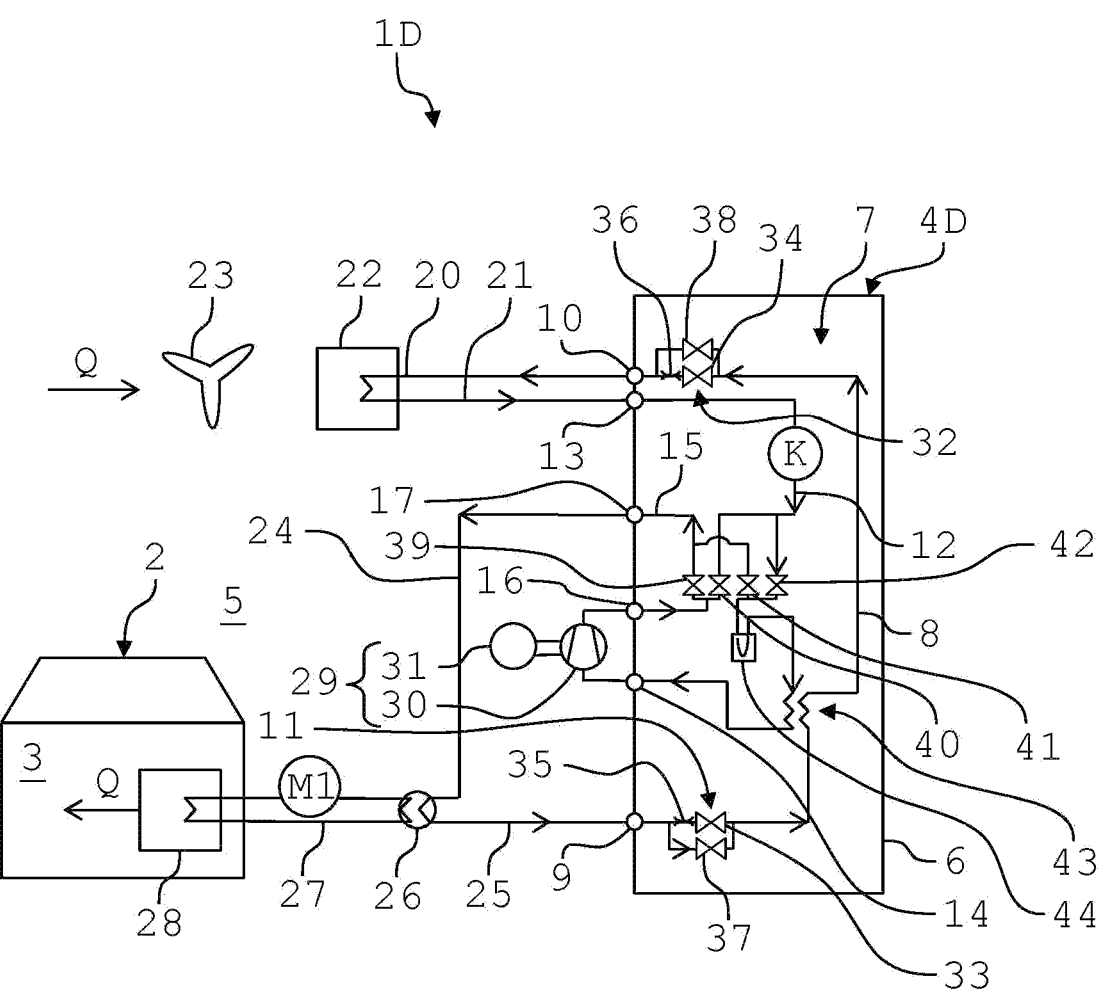
FIG. 4 shows a schematic view of another embodiment of a heating and cooling system.

FIG. 4 shows a schematic view of another embodiment of a heating and cooling system 1D. The heating and cooling system 1D differs from the heating and cooling system 1C by an alternative embodiment of the heating and cooling module 4D.

In the heating and cooling module 4D according to FIG. 4, in comparison to the heating and cooling module 4C, an internal recycling unit 44 for the refrigerant K is additionally integrated in the refrigerant guiding block 6. The recycling unit 44 can be integrated as a cavity in the refrigerant guiding block 6.

The recycling unit 44 may include a buffer tank, a dryer, and/or a filter for the refrigerant K. The recycling unit 44 may also be a receiver, an accumulator, or the like. The functionality of the heating and cooling system 1D is otherwise the same as that of the heating and cooling system 1B.

Figure 5:
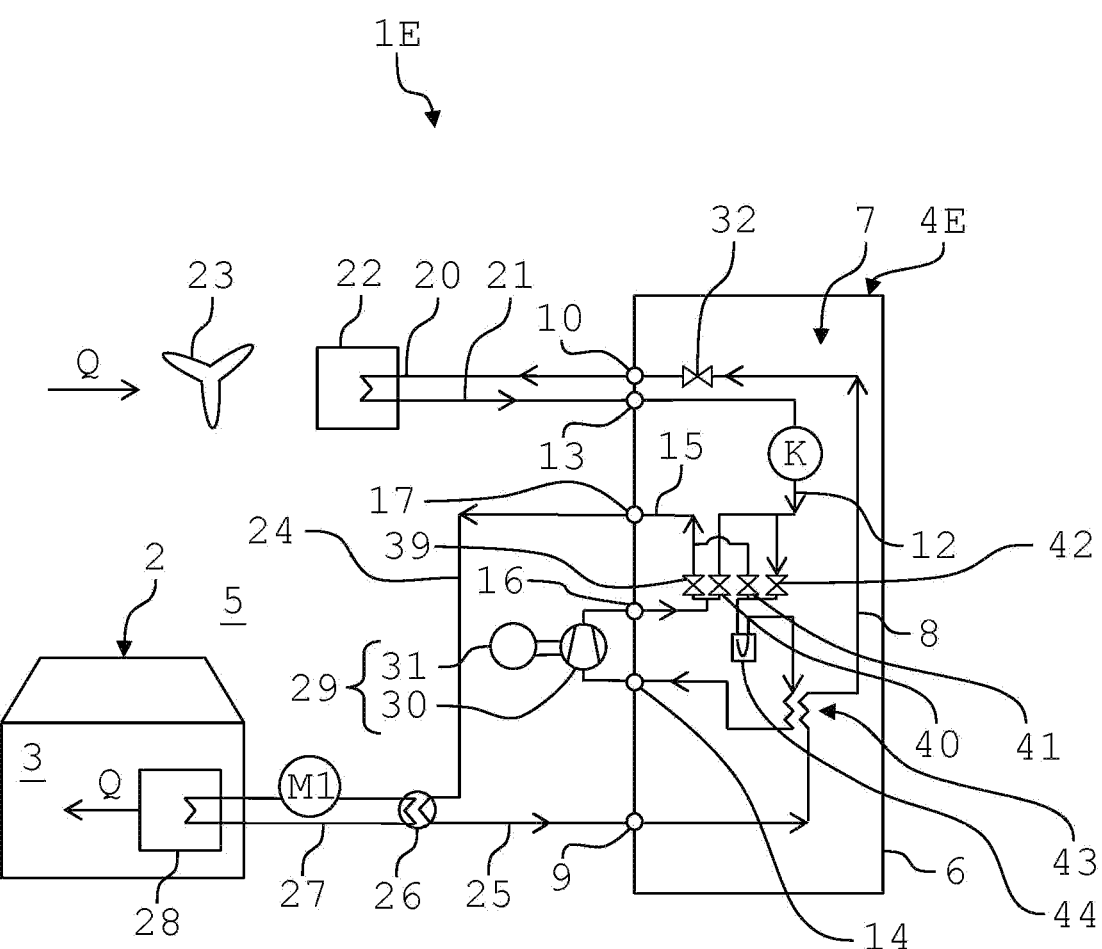
FIG. 5 shows a schematic view of another embodiment of a heating and cooling system.

FIG. 5 shows a schematic view of another embodiment of a heating and cooling system 1E. The heating and cooling system 1E differs from the heating and cooling system 1D by an alternative embodiment of the heating and cooling module 4E.

In this embodiment of the heating and cooling module 4E according to FIG. 5, the refrigerant guiding block 6, in contrast to the heating and cooling module 4D, does not comprise two throttle valves 11, 32 with bypass valves 37, 38, but only one throttle valve 32 without bypass valve 37, 38. In this case, the flow through the throttle valve 32 is on both sides.

If the flow is in the opposite direction to the throttle direction, the throttle valve 32 allows liquid refrigerant K to be passed on unthrottled. The throttle valve 32 permits unthrottled liquid/liquid expansion and throttled liquid/wet steam expansion. The functionality of the heating and cooling system 1E otherwise corresponds to that of the heating and cooling system 1B.

Figure 6:
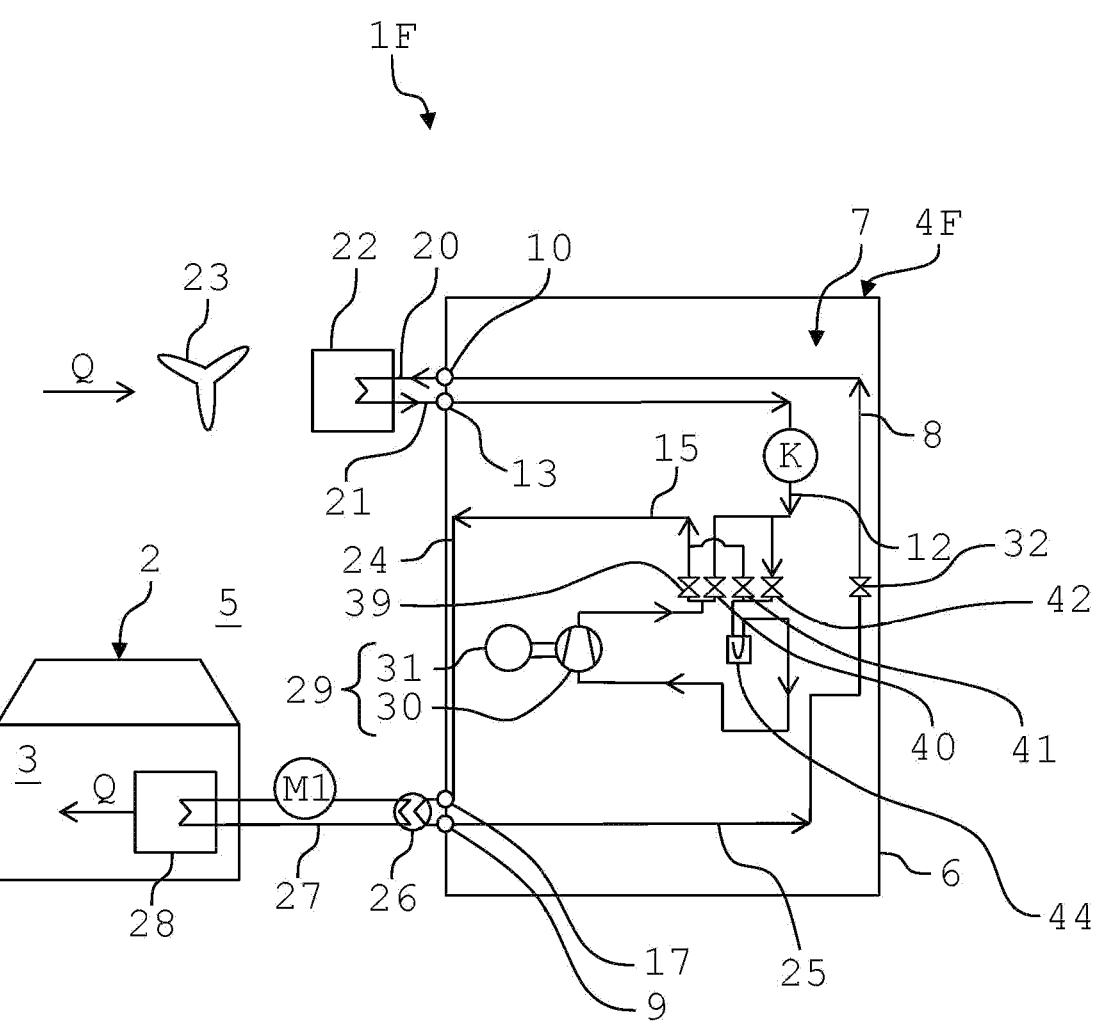
FIG. 6 shows a schematic view of another embodiment of a heating and cooling system.

FIG. 6 shows a schematic view of another embodiment of a heating and cooling system 1F. The heating and cooling system 1F differs from the heating and cooling system 1E by an alternative design of the heating and cooling module 4F.

In contrast to the heating and cooling module 4E, the refrigerant guiding block 6 of the heating and cooling module 4F according to FIG. 6 does not comprise an internal heat exchanger 43. Optionally, however, the heat exchanger 43 may be provided. As with the heating and cooling module 4E, only a throttle valve 32 through which flow can pass on both sides is provided in the refrigerant guiding block 6. The throttle valve 32 throttles in both directions.

In addition, the compressor 29 is partially or fully integrated into the refrigerant guiding block 6. For example, only the compressor geometry 30 can be located within the refrigerant guiding block 6. However, the entire compressor 29, that is, the compressor geometry 30 and the motor 31, may also be located within the refrigerant guiding block 6. The functionality of the heating and cooling system 1F is otherwise the same as that of the heating and cooling system 1B.

Figure 7:
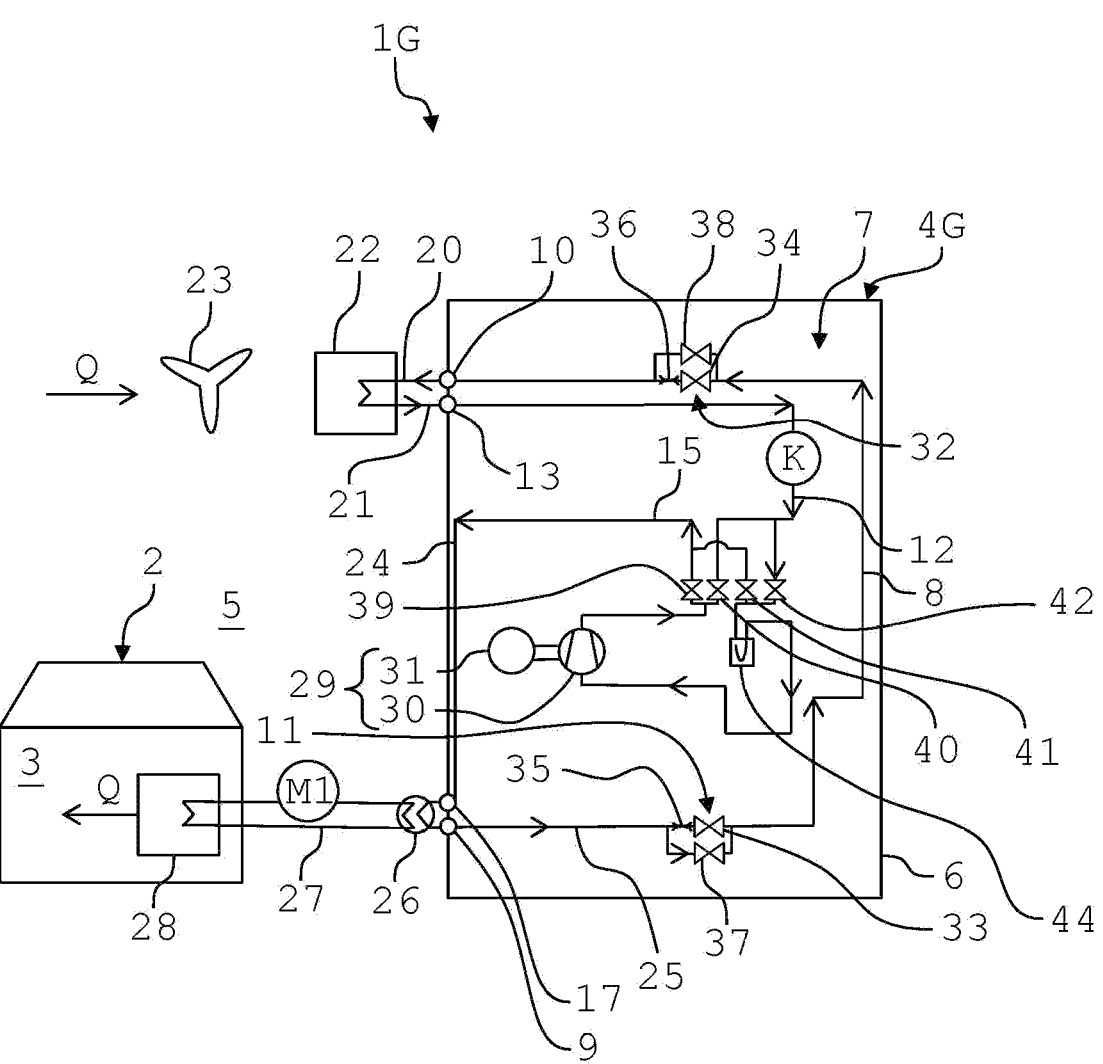
FIG. 7 shows a schematic view of another embodiment of a heating and cooling system.

FIG. 7 shows a schematic view of another embodiment of a heating and cooling system 1G. The heating and cooling system 1G differs from the heating and cooling system 1B by an alternative design of the heating and cooling module 4G.

In contrast to the heating and cooling module 4B, in the heating and cooling module 4G according to FIG. 7, the compressor 29 is integrated into the refrigerant guiding block 6, as explained previously with respect to the heating and cooling module 4F. Furthermore, an integrated recycling unit 44 is provided. The heat exchanger 26 may also be at least partially integrated into the refrigerant guiding block 6. Otherwise, the heating and cooling module 4G is similar in structure to the heating and cooling module 4B. The functionality of the heating and cooling system 1G also corresponds to that of the heating and cooling system 1B.

Figure 8:
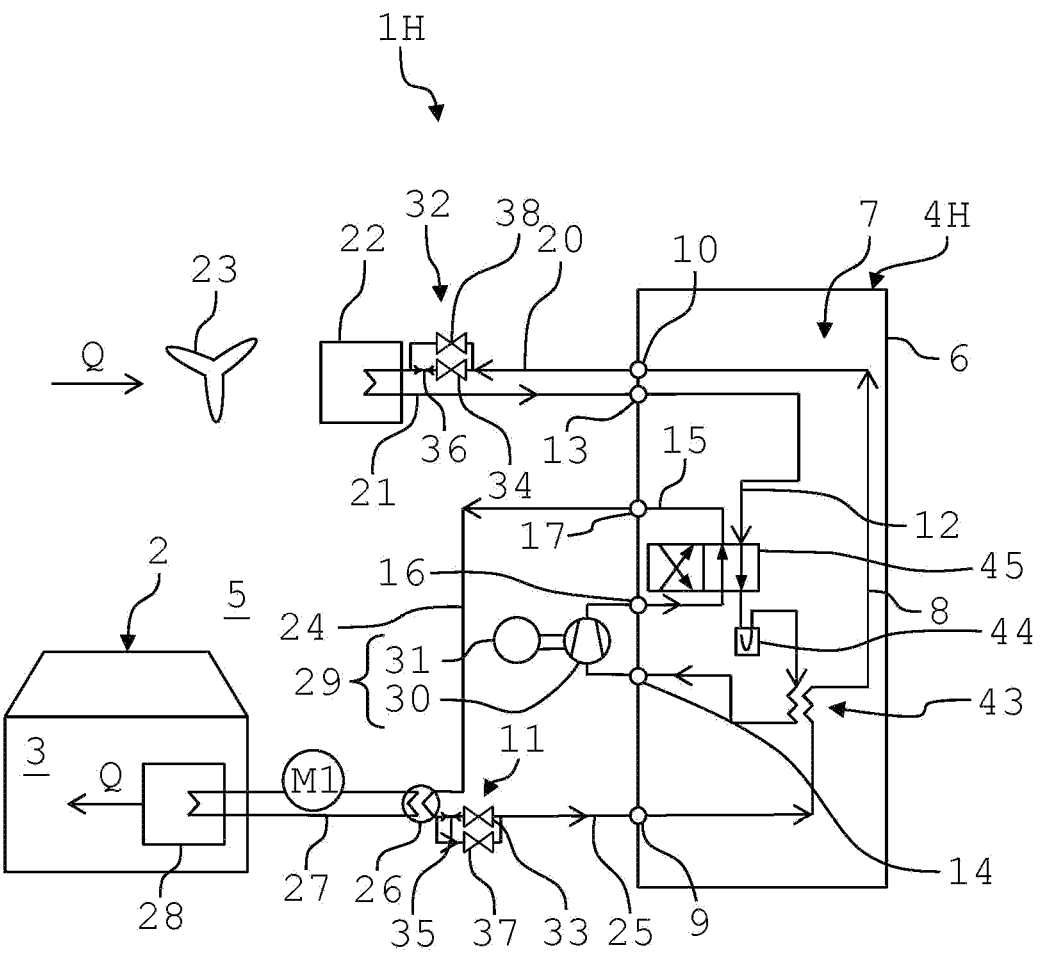
FIG. 8 shows a schematic view of another embodiment of a heating and cooling system.

FIG. 8 shows a schematic view of another embodiment of a heating and cooling system 1H. The heating and cooling system 1H differs from the heating and cooling system 1B by an alternative embodiment of the heating and cooling module 4H.

In contrast to the heating and cooling module 4B, in the heating and cooling module 4H shown in FIG. 8, the throttle valves 11, 32 with the associated bypass valves 37, 38 are arranged outside the refrigerant guiding block 6.

Instead of the switch valves 39 to 42 for circuit reversal, a switch unit or switch valve unit 45 is provided which enables the aforementioned circuit reversal of the refrigerant K in the refrigerant circuit 7. Such a switch valve unit 45 allows, for example, the number of switch valves 39 to 42 otherwise provided to be reduced. Furthermore, an internal heat exchanger 43 and an integrated recycling unit 44 are provided. The functionality of the heating and cooling system 1H is otherwise the same as that of the heating and cooling system 1B.

Figure 9:
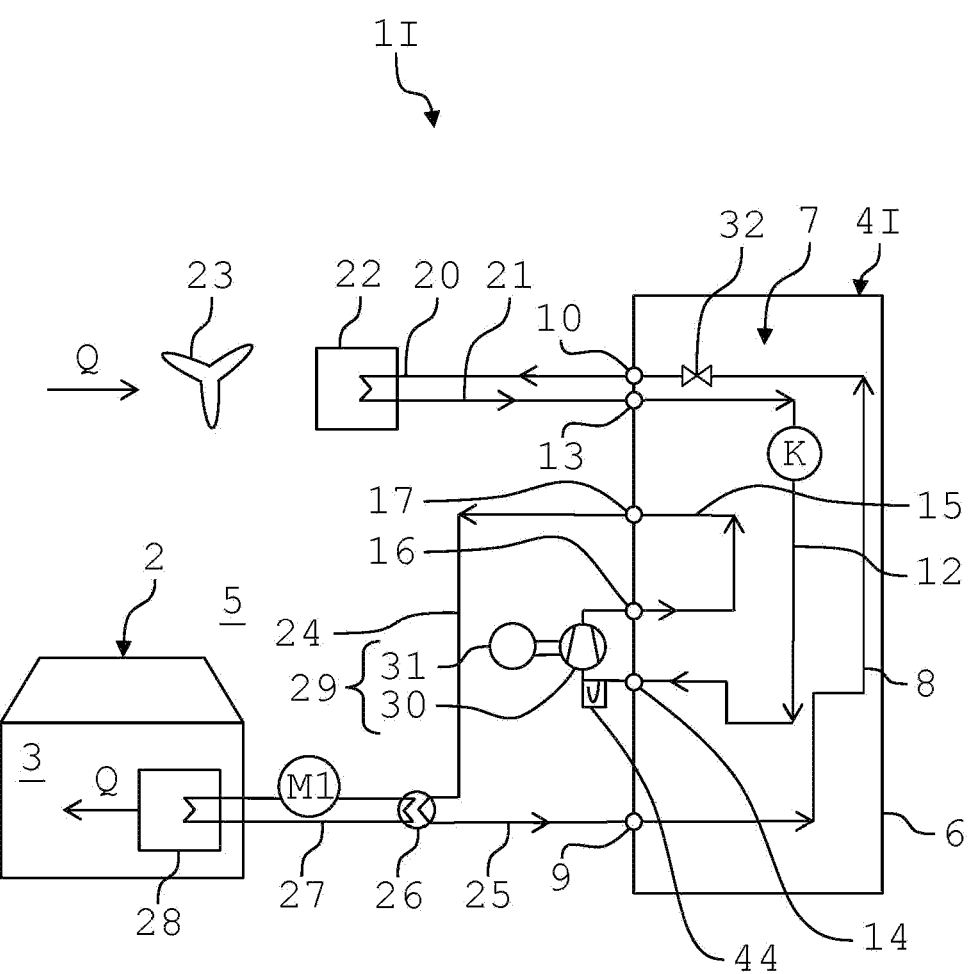
FIG. 9 shows a schematic view of another embodiment of a heating and cooling system.

FIG. 9 shows a schematic view of another embodiment of a heating and cooling system 1I. The heating and cooling system 1I differs from the heating and cooling system 1A by an alternative embodiment of the heating and cooling module 4I.

The heating and cooling module 4I according to FIG. 9 comprises a recycling unit 44 as previously mentioned but arranged outside the refrigerant guiding block 6. The refrigerant guiding block 6 includes a throttle valve 32 as previously explained. The throttle valve 32 is located in close proximity to the heat exchanger 22. The functionality of the heating and cooling system 1I is otherwise the same as that of the heating and cooling system 1A.

Figure 10:
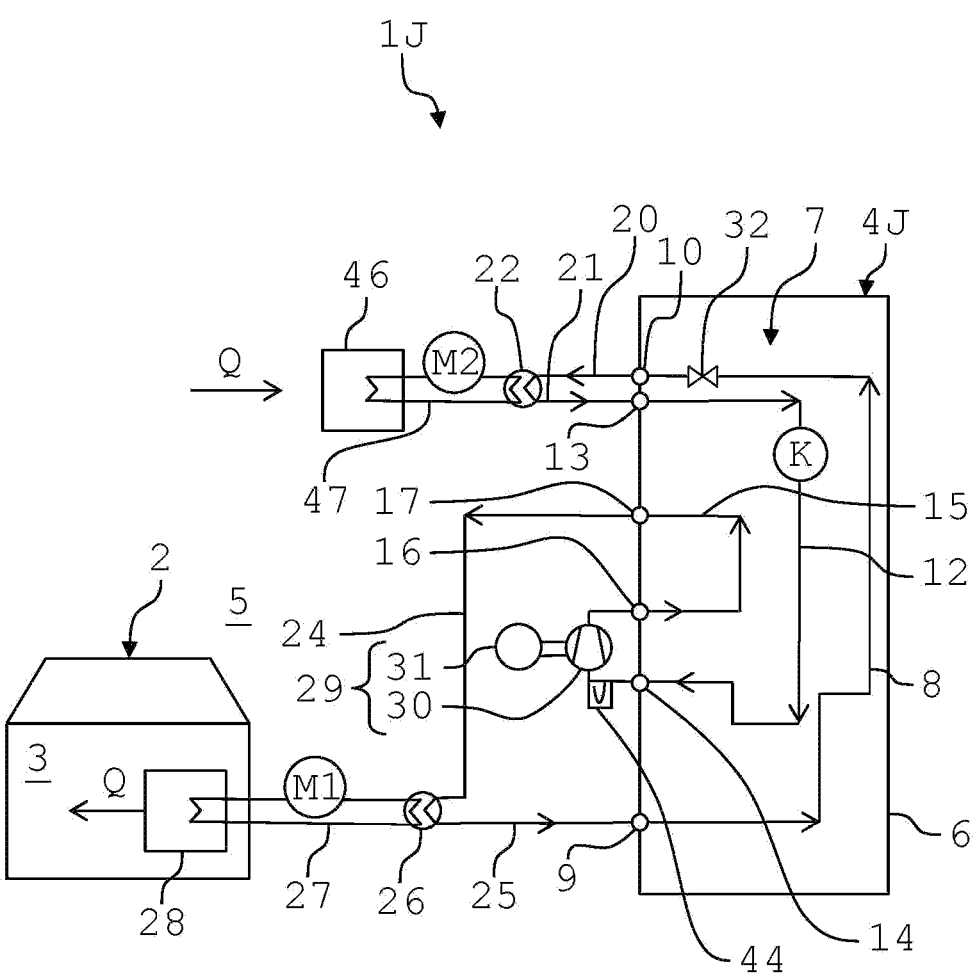
FIG. 10 shows a schematic view of another embodiment of a heating and cooling system.

FIG. 10 shows a schematic view of another embodiment of a heating and cooling system 1J. The heating and cooling system 1J differs from the heating and cooling system 1I by an alternative design of the heating and cooling module 4J.

In the heating and cooling module 4J according to FIG. 10, in contrast to the heating and cooling module 4I, a further heat exchanger 46, in particular a refrigerant-liquid heat exchanger, is provided.

The heat exchanger 46 exchanges heat Q with the heat exchanger 22, which is designed as a heat carrier medium heat exchanger, by means of a heat carrier medium circuit 47 in which a heat carrier medium M2, for example water, circulates. The functionality of the heating and cooling system 1J is otherwise the same as that of the heating and cooling system 1A.

Figure 11:
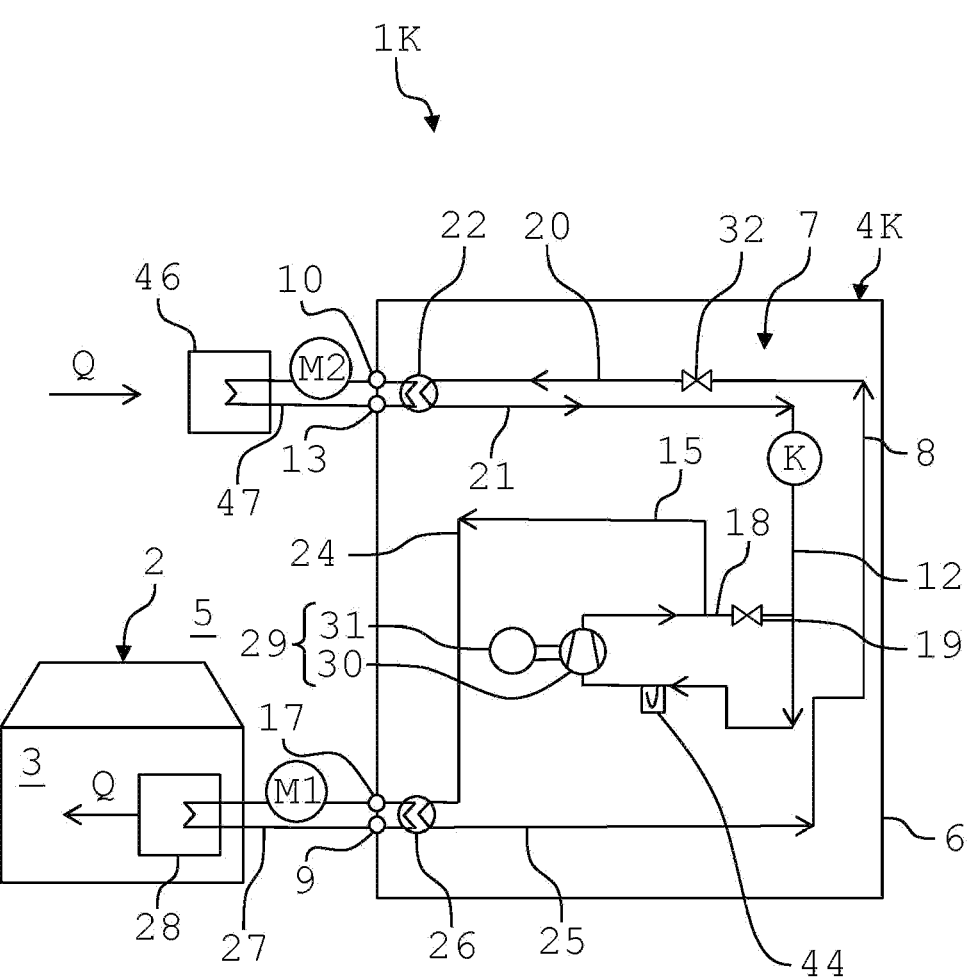
FIG. 11 shows a schematic view of another embodiment of a heating and cooling system.

FIG. 11 shows a schematic view of another embodiment of a heating and cooling system 1K. The heating and cooling system 1K differs from the heating and cooling system 1J by an alternative design of the heating and cooling module 4K.

In the heating and cooling module 4K according to FIG. 11, in contrast to the heating and cooling module 4J, the compressor 29, the heat exchanger 22 and the heat exchanger 26 are also integrated into the refrigerant guiding block 6. In addition, the refrigerant guiding block 6 also comprises a valve 19 as explained with reference to FIG. 1. The functionality of the heating and cooling system 1K otherwise corresponds to that of the heating and cooling system 1A.

The valve 19 may be used, for example, for capacity control. Alternatively, such refrigerant routing via the valve 19 may be used, for example, to de-ice an air-to-refrigerant heat exchanger. The recycling unit 44 is integrated into the refrigerant guiding block 6, as previously mentioned with reference to FIG. 10. The recycling unit 44 may be or include a buffer tank. The buffer tank may include other internals such as an intake tube with a sniffer bore and filtration and/or drying means.

In the event that the heat exchangers 22, 26 are integrated into the refrigerant guiding block 6, it is advantageous if this is divided into at least a first part or lower part and a second part or upper part. Individual plates of the heat exchangers 22, 26 as well as internals of the recycling unit 44 can then be inserted into the lower part.

After the upper part has been attached (e.g., firmly connected) to the lower part of the refrigerant guiding block 6, the latter can be non-detachably soldered in a continuous furnace, for example, or also connected in a refrigerant-tight manner by means of adhesive bonds. It is understood that only one heat exchanger 22, 26 can be integrated at a time and the other heat exchanger 22, 26 can be detached from the refrigerant guiding block 6 but coupled to it by means of connecting elements.

Figure 12:
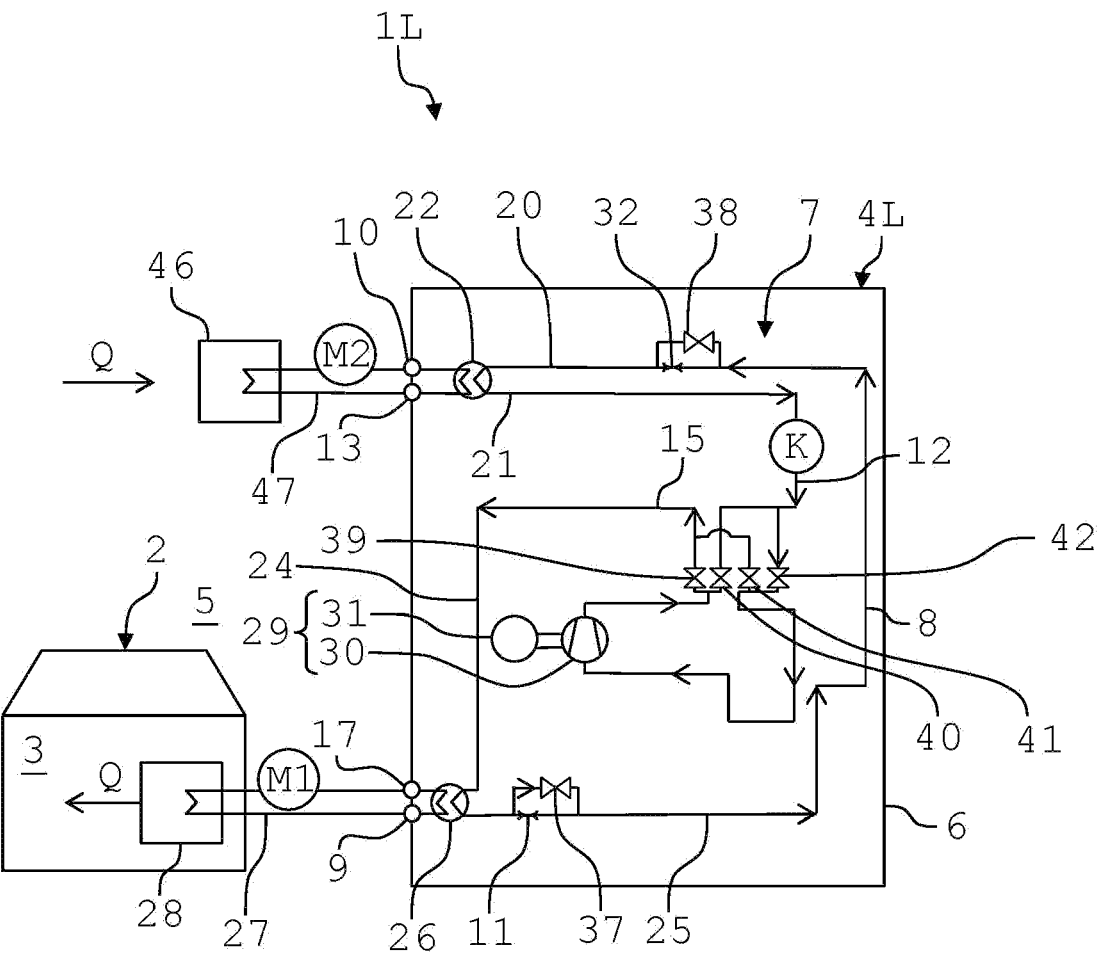
FIG. 12 shows a schematic view of another embodiment of a heating and cooling system.

FIG. 12 shows a schematic view of another embodiment of a heating and cooling system 1L. The heating and cooling system 1L differs from the heating and cooling system 1K by an alternative design of the heating and cooling module 4L.

The heating and cooling module 4L according to FIG. 12 corresponds in its structure to that of the heating and cooling module 4K with the difference that the refrigerant guiding block 6 comprises switch valves 39 to 42, throttle valves 11, 32 and bypass valves 37, 38 as explained with reference to the heating and cooling module 4B according to FIG. 2. The heat exchangers 22, 26 are again integrated into the refrigerant guiding block 6. The functionality of the heating and cooling system 1L otherwise corresponds to that of the heating and cooling system 1B.

Figure 13:
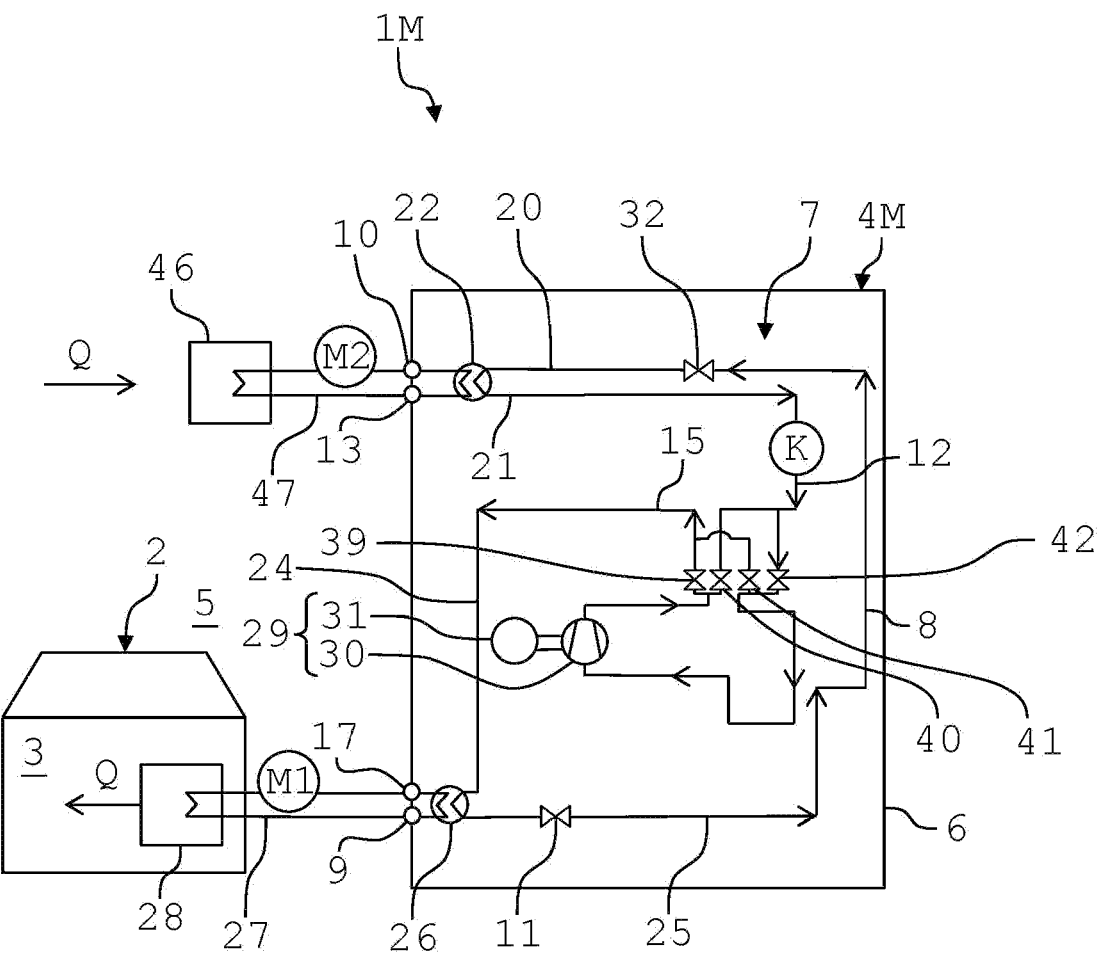
FIG. 13 shows a schematic view of another embodiment of a heating and cooling system.

FIG. 13 shows a schematic view of another embodiment of a heating and cooling system 1M. The heating and cooling system 1M differs from the heating and cooling system 1L by an alternative design of the heating and cooling module 4M.

In contrast to the heating and cooling module 4L, the refrigerant guiding block 6 of the heating and cooling module 4M according to FIG. 13 comprises two throttle valves 11, 32 without bypass valves 37, 38. Both throttle valves 11, 32 can be flowed through in both flow directions, with unthrottled or throttled flow as required. The functionality of the heating and cooling system 1M otherwise corresponds to that of the heating and cooling system 1B.

Figure 14:
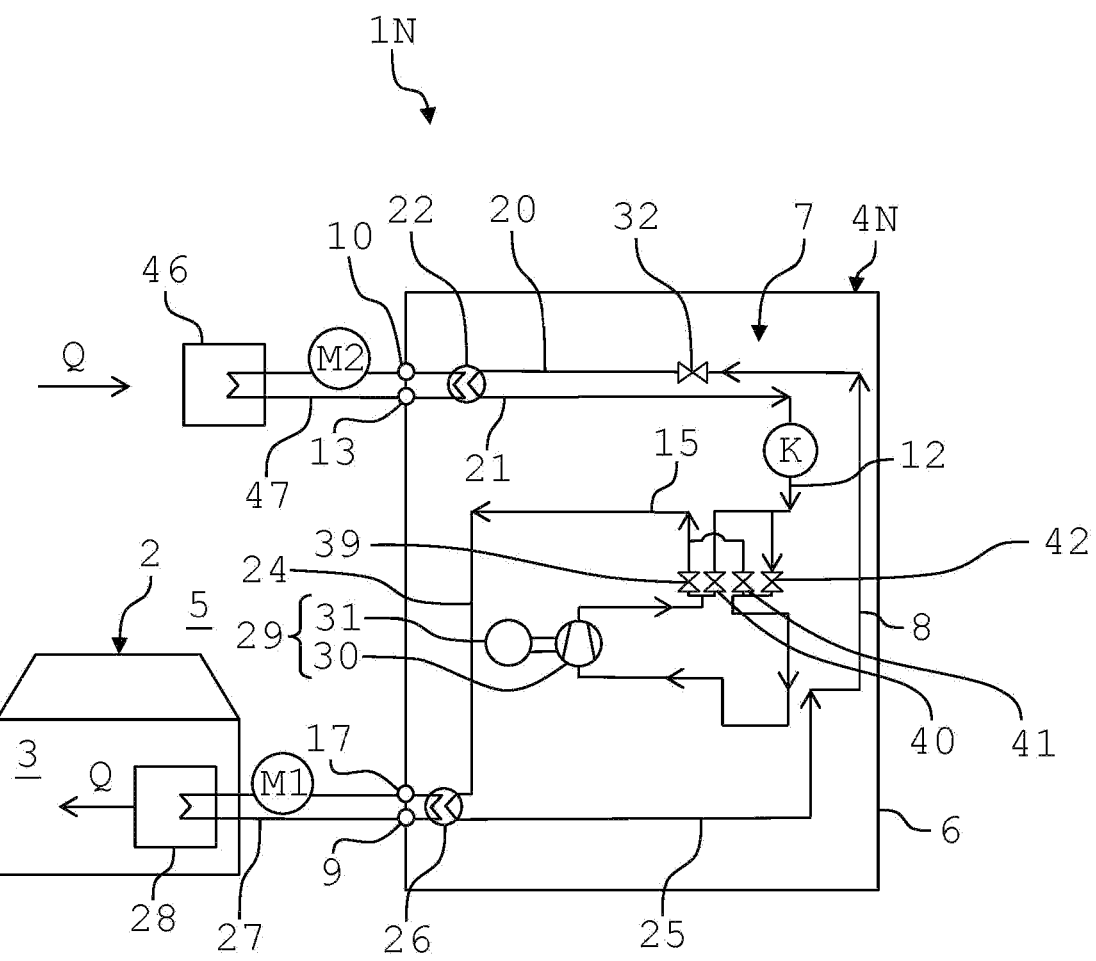
FIG. 14 shows a schematic view of another embodiment of a heating and cooling system.

FIG. 14 shows a schematic view of another embodiment of a heating and cooling system 1N. The heating and cooling system 1N differs from the heating and cooling system 1M by an alternative design of the heating and cooling module 4N.

The heating and cooling module 4N according to FIG. 14 comprises only one throttle valve 32 and not two throttle valves 11, 32. The throttle valve 32 is integrated in the refrigerant guiding block 6. The throttle valve 32 throttles in both directions in a fixed or controlled manner. The functionality of the heating and cooling system 1N is otherwise the same as that of the heating and cooling system 1B.

Figure 15:
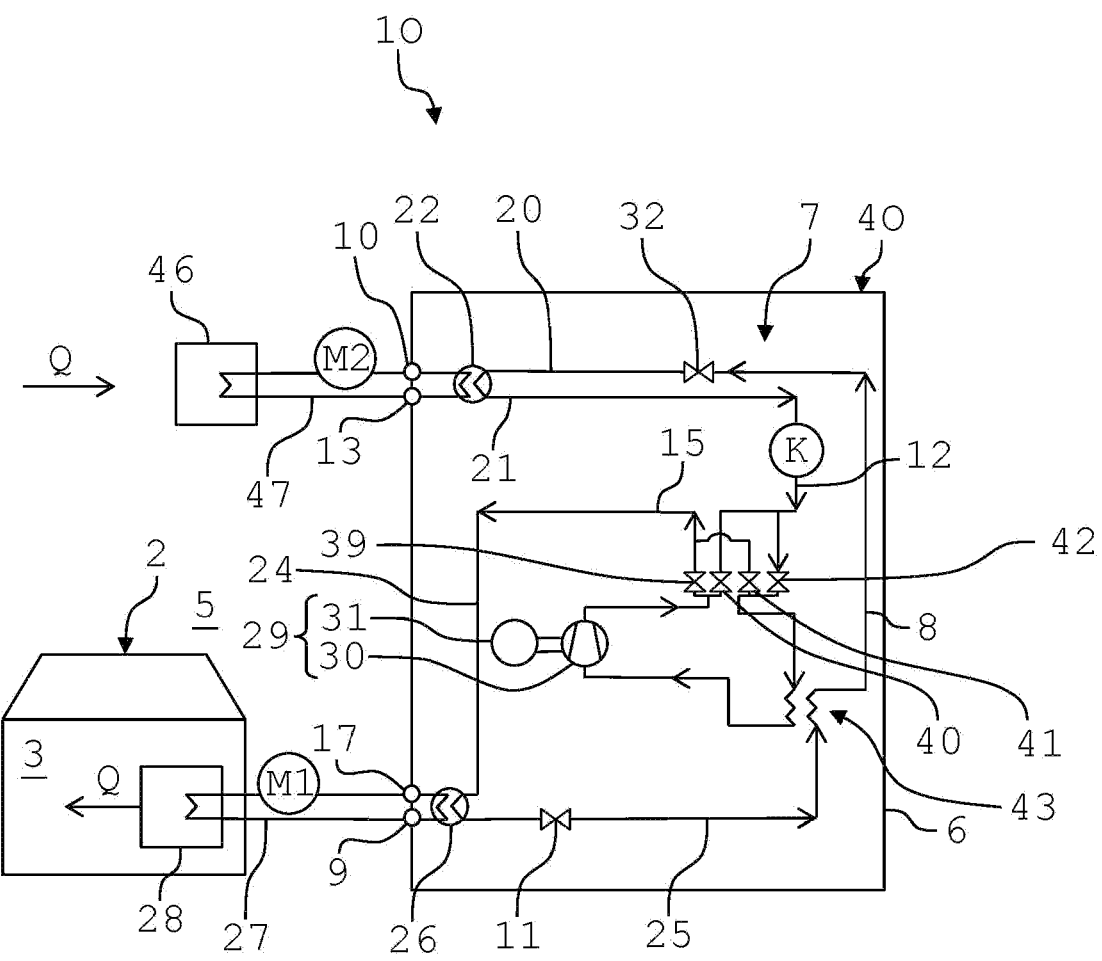
FIG. 15 shows a schematic view of another embodiment of a heating and cooling system.

FIG. 15 shows a schematic view of another embodiment of a heating and cooling system 1O. The heating and cooling system 1O differs from the heating and cooling system 1M by an alternative design of the heating and cooling module 4O.

In contrast to the heating and cooling module 4M, the refrigerant guiding block 6 of the heating and cooling module 4O according to FIG. 15 comprises an internal heat exchanger 43 as explained before, which allows an exchange of heat Q between the refrigerant lines 8, 12.

The heat exchanger 43 is preferably arranged upstream of the compressor 29 on a low-pressure side of the refrigerant circuit 7. This serves to additionally subcool liquid refrigerant K coming from the heat exchanger 26. As a result of the heat exchange with refrigerant vapor, additional superheating is generated there. All in all, this supplies an increase in the efficiency of the heating and cooling module 4O.

In principle, all possible types of heat exchanger serving this purpose, and which can be integrated into the refrigerant guiding block 6 are conceivable. For example, this also applies to coaxial heat exchangers or tube bundle variants. The functionality of the heating and cooling system 1O otherwise corresponds to that of the heating and cooling system 1B.

Figure 16:
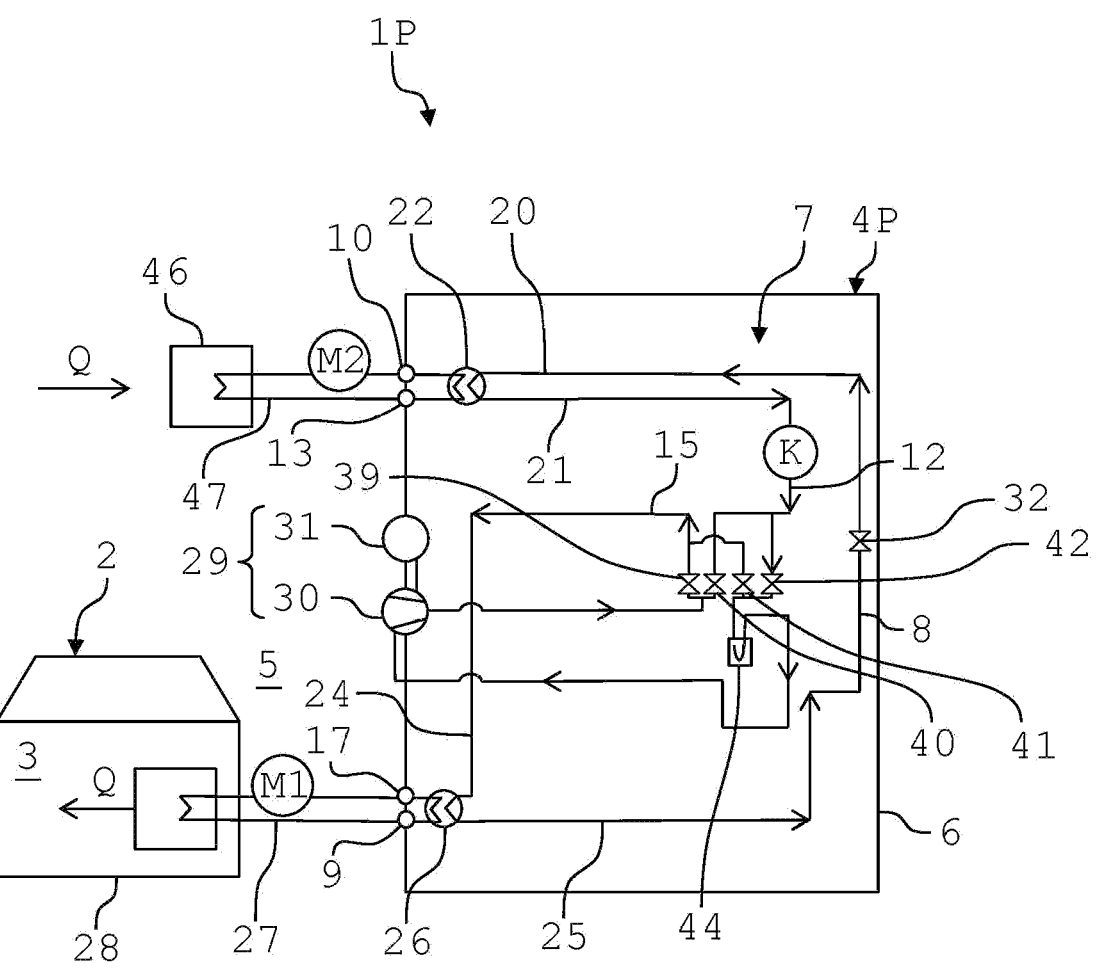
FIG. 16 shows a schematic view of another embodiment of a heating and cooling system.

FIG. 16 shows a schematic view of another embodiment of a heating and cooling system 1P. The heating and cooling system 1P differs from the heating and cooling system 1N by an alternative design of the heating and cooling module 4P.

The heating and cooling module 4P according to FIG. 16 differs from the heating and cooling module 4N in that a recycling unit 44 as mentioned before is integrated into the refrigerant guiding block 6. The compressor 29 is partially integrated into the refrigerant guiding block 6. Accordingly, the refrigerant guiding block 6 becomes part of a compressor housing of the compressor 29, for example, and can accommodate corresponding internals of the compressor 29, for example the compressor geometry 30. The functionality of the heating and cooling system 1P otherwise corresponds to that of the heating and cooling system 1B.

Common to all the above embodiments of the heating and cooling module 4A to 4P is that any switches and sensors or other electronics can also be integrated into the refrigerant guiding block 6. Also, a pressure accumulator may be integrated into the refrigerant guiding block 6. The refrigerant guiding block 6 can further comprise control technology components, such as sensors, control units, coils or comparable electromechanical and/or mechanical components.

Figure 17:
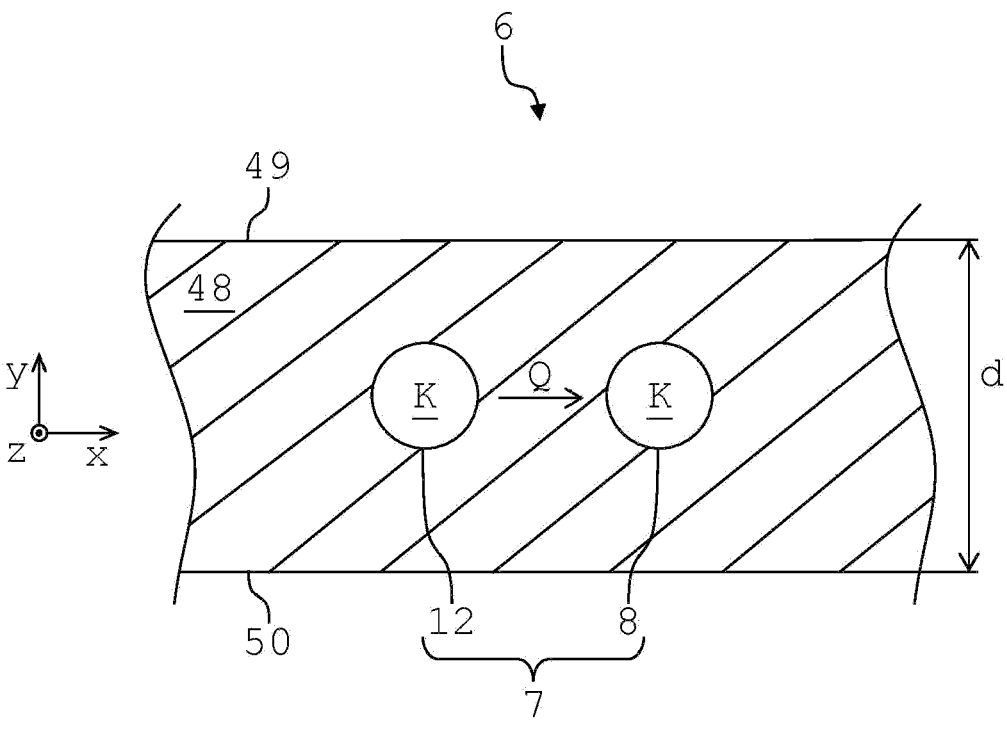
FIG. 17 shows a schematic detailed sectional view of one embodiment of a refrigerant guiding block according to section line XVII-XVII of FIG. 1.

FIG. 17 shows a schematic detailed sectional view of one embodiment of a refrigerant guiding block 6 as mentioned above for the embodiments of the heating and cooling module 4A to 4P explained above. FIG. 17 shows an example of a detailed sectional view of the refrigerant guiding block 6 indicated by section lines XVII-XVII in FIG. 1.

A coordinate system with a width direction or x-direction x, a height direction or y-direction y and a depth direction or z-direction z is assigned to the refrigerant guiding block 6. The directions x, y, z are oriented perpendicular to each other.

The section according to FIG. 17 runs through the refrigerant lines 8, 12, which are part of the refrigerant circuit 7. The following explanations concerning the refrigerant lines 8, 12 are correspondingly also applicable to the refrigerant lines 15, 18, 20, 21, 25 or other components of the refrigerant circuit 7, provided they are integrated in the refrigerant guiding block 6.

"Integrated" in this context means that the refrigerant lines 8, 12, 15, 18, 20, 21, 25 are directly embedded or worked into a material 48 shown hatched in FIG. 17. The material 48 may also be referred to as substance or refrigerant guide block material. For example, the refrigerant circuit includes refrigerant lines that may be at least partially routed (e.g., positioned) within the refrigerant guiding block.

The "integration" or "embedding" of the refrigerant lines 8, 12, 15, 18, 20, 21, 24, 25 into the material 48 can be done, for example, by drilling, milling or eroding. Additive or generative manufacturing methods, in particular 3D printing, may also be used. "Integrated" can also mean that the refrigerant lines 8, 12, 15, 18, 20, 21, 24, 25 are circumferentially completely surrounded by the material 48. However, this is not absolutely necessary.

The same applies to the switch valves 39 to 42 integrated in the refrigerant guiding block 6, the valve 19, the throttle valves 11, 32, the bypass valves 37, 38, the compressor 29, the heat exchangers 22, 26, the heat exchanger 43, the recycling unit 44 and/or the switch valve unit 45. This also applies to any other components of the refrigerant circuit 7.

"Integrated" also means that the refrigerant K comes into direct contact with the material 48. However, this does not preclude the refrigerant lines 8, 12, 15, 18, 20, 21, 24, 25 from being internally coated, for example to prevent or impede corrosion.

As previously mentioned, the refrigerant guiding block 6 may be made of an aluminum alloy or magnesium alloy. That is, the material 48 may be an aluminum alloy or magnesium alloy. However, other metallic materials may also be used. Furthermore, the refrigerant guiding block 6 may also be made of a plastic material. Ceramic materials may also be used as the material 48.

The refrigerant guiding block 6 is cuboidal, preferably plate-shaped, and comprises an upper side 49 and a bottom side 50 facing away from the upper side 49. "Plate-shaped" means that a thickness d of the refrigerant guiding block 6 considered along the y-direction y is smaller than a width thereof considered along the x-direction x and a depth thereof considered along the z-direction z. The thickness d may be a few centimeters.

As FIG. 17 shows, the refrigerant lines 8, 12 have a circular cross-section. This results, for example, if the refrigerant lines 8, 12 are designed as bores passing through the refrigerant guiding block 6. However, the refrigerant lines 8, 12 can in principle have any desired cross section.

The refrigerant lines 8, 12 or any other cavities can also be introduced into the refrigerant guiding block 6 by eroding. Fabrication-related openings or the like leading into the surroundings 5 that have no function can, for example, be welded or bonded in a fluid-tight manner. Furthermore, the refrigerant guiding block 6 can also be built "around" the refrigerant lines 8, 12 in a generative or additive manufacturing method.

The refrigerant guiding block 6 according to FIG. 17 is formed integral, in particular as a single piece of material. However, the refrigerant guiding block 6 can also be composed of several individual parts which are joined together by a material bond. In the case of materially bonded connections, the connecting partners are held together by atomic or molecular forces. Materially bonded connections are non-detachable connections that can only be separated by destroying the connecting means and/or the connecting partners.

This means that the individual parts of the refrigerant guiding block 6 can no longer be separated from each other without being destroyed. For example, the individual parts are soldered or welded together in a fluid-tight manner. The refrigerant guiding block 6 can therefore also be referred to as a monoblock or refrigerant guiding monoblock.

Since the refrigerant guiding block 6 is preferably made of a metallic material, it has heat-conducting properties. In operation, for example in heating operation, of the respective heating and cooling system 1A to 1P or the respective heating and cooling module 4A to 4P, this can result in heat Q being transferred from the refrigerant K supplied through the refrigerant line 12 to the compressor 29 to the refrigerant K supplied through the refrigerant line 8 to the heat exchanger 22. In cooling mode, the heat flow is reversed.

Thus, an exchange of heat Q takes place in the refrigerant guiding block 6, which is undesirable because it reduces the efficiency of the respective heating and cooling module 4A to 4P. This exchange of heat Q is particularly large when the temperature difference between the refrigerant lines 8, 12 is large, for example −15° C. to +75° C. In contrast, in the area of the internal heat exchanger 43, an exchange of heat Q within the refrigerant guiding block 6 is desired.

Figure 18:
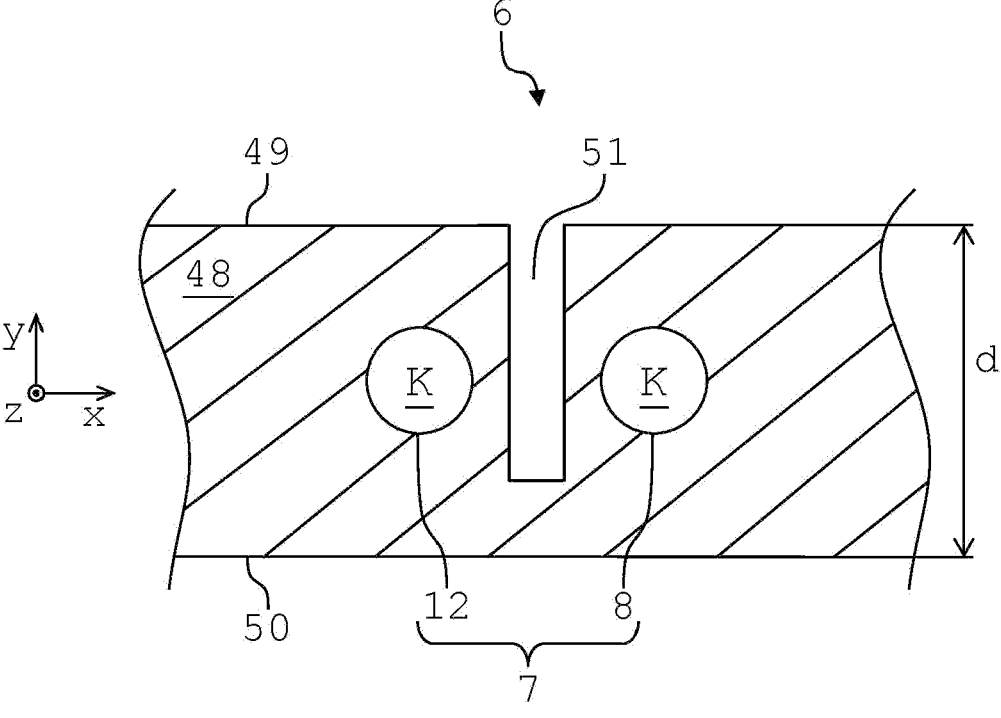
FIG. 18 shows a schematic detailed sectional view of another embodiment of a refrigerant guiding block according to section line XVII-XVII of FIG. 1.

FIG. 18 shows a schematic detailed sectional view of another embodiment of a refrigerant guiding block 6, in which a thermal separation is implemented between the refrigerant lines 8, 12, which prevents or at least reduces the transfer of heat Q between the refrigerant lines 8, 12.

For thermal separation or insulation, a gap 51 is inserted centrally or eccentrically in the refrigerant guiding block 6 (e.g., positioned) between the refrigerant lines 8, 12 positioned adjacent to one another. The gap 51 is filled with air and can therefore be referred to as an air gap. The air has insulating or damping properties.

The gap 51 can be introduced into the refrigerant guiding block 6 using a milling process or eroding process, for example. The gap 51 can extend into the refrigerant guiding block 6 from the upper side 49 in the direction of the bottom side 50. However, the gap 51 may also be provided at the bottom side 50. The gap 51 may not extend completely through the refrigerant guiding block 6, as shown in FIG. 18.

However, it is also possible for the gap 51 to extend completely through the refrigerant guiding block 6. Furthermore, the gap 51 may also be in the form of a cavity completely surrounded by the material 48, for example as a bore provided between the refrigerant lines 8, 12.

The gap 51 can follow a course of the respective refrigerant line 8, 12 through the refrigerant guiding block 6. Several gaps 51 may be provided. For example, such a gap 51 is provided on both sides of each refrigerant line 8, 12.

Figure 19:
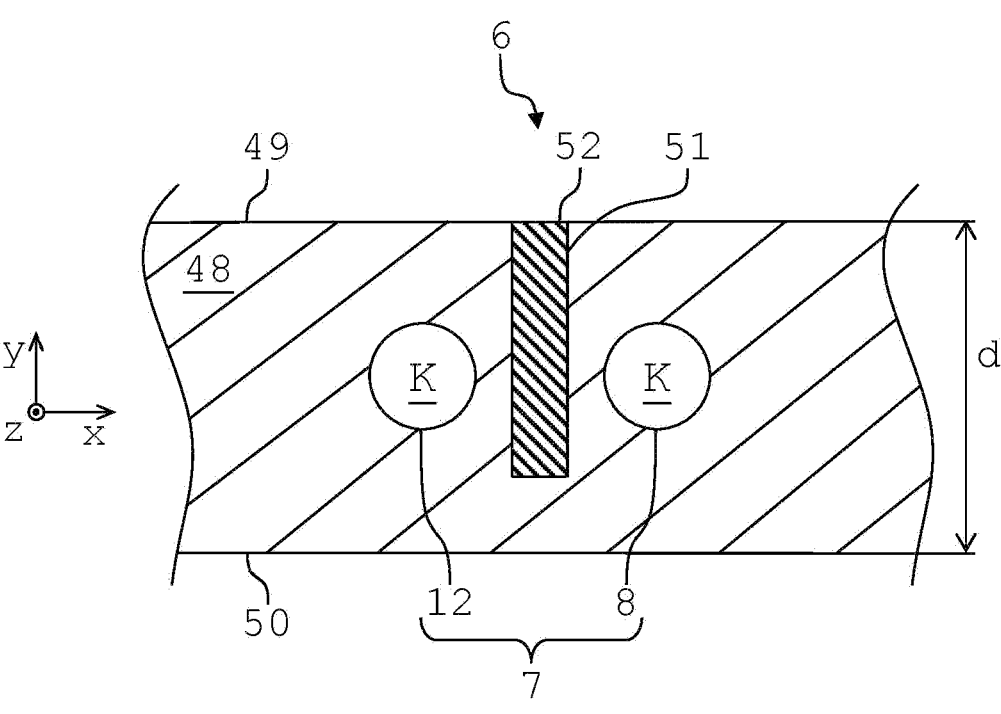
FIG. 19 shows a schematic detailed sectional view of another embodiment of a refrigerant guiding block according to section line XVII-XVII of FIG. 1.

FIG. 19 shows a schematic detailed sectional view of another embodiment of a refrigerant guiding block 6 in which, compared to the refrigerant guiding block according to FIG. 18, a further improved thermal separation between the refrigerant lines 8, 12 is realized.

For this purpose, the gap 51 is at least partially, but preferably completely, filled with an insulating material 52. The insulating material 52 has a lower thermal conductivity than the material 48. The insulating material 52 can be, for example, a polyurethane foam (PU), which is introduced in liquid form into the gap 51, where it foams and hardens and/or crosslinks. Preferably, the insulating material 52 is a foam or comprises pores that may be closed or open. The insulating material 52 may also be an injection molded plastic component that is bonded and/or inserted into the gap 51.

Figure 20:
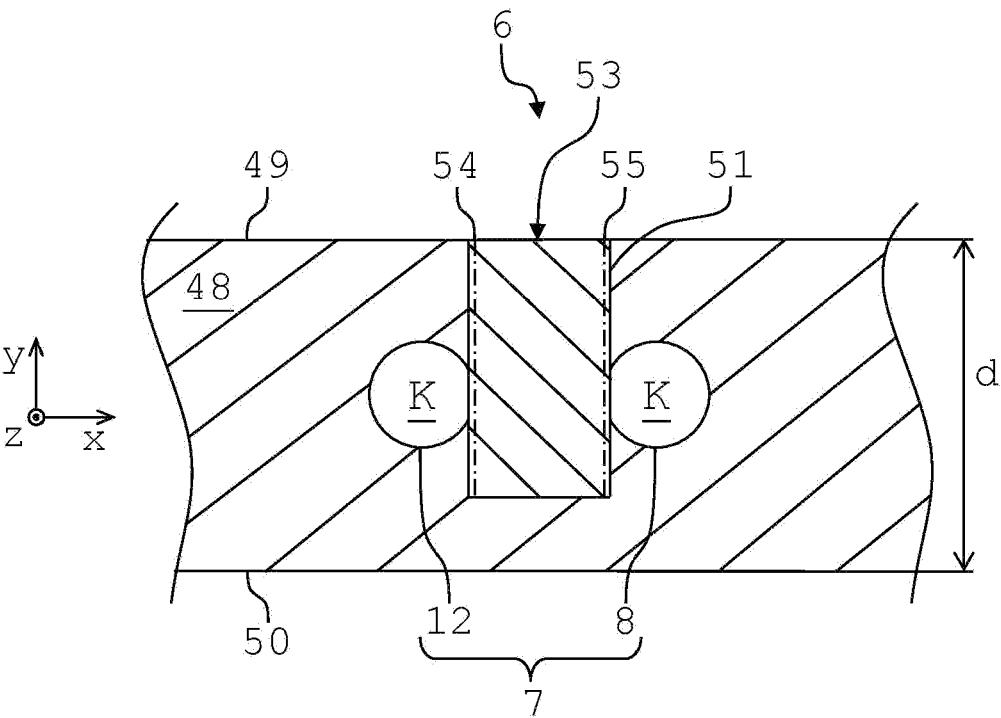
FIG. 20 shows a schematic detailed sectional view of another embodiment of a refrigerant guiding block according to section line XVII-XVII of FIG. 1.

FIG. 20 shows a schematic detailed sectional view of another embodiment of a refrigerant guiding block 6 in which, compared to the refrigerant guiding block according to FIG. 19, a further improved thermal separation between the refrigerant lines 8, 12 is realized.

In this embodiment of the refrigerant guiding block 6, the gap 51 is so wide that it intersects refrigerant lines 8, 12. This means that the refrigerant lines 8, 12 are at least partially open or open towards the gap 51 at their circumference, so that the refrigerant K can flow into the gap 51.

In order to seal the refrigerant lines 8, 12 fluid-tightly against the gap 51 and at the same time to achieve thermal separation of the refrigerant lines 8, 12 as mentioned above, a damping element or insulating element 53 is accommodated in the gap 51. The insulating element 53 can be glued or welded into the gap 51. The insulating element 53 is made of a material that comprises a lower thermal conductivity than the material 48.

Preferably, the insulating element 53 is a plastic component, in particular an injection-molded plastic component. Suitable plastic materials include, for example, polyethylene (PE), polypropylene (PP), acrylonitrile-butadiene-styrene (ABS), polyoxymethylene (POM), polyetheretherketone (PEEK) or other suitable thermoplastics.

At least on the refrigerant side, i.e. facing (e.g., in communication with) the refrigerant K, the insulating element 53 comprises a coating 54, 55, which is shown by dashed lines in FIG. 20. The coating 54, 55 is diffusion-tight. The coating 54, 55 is metallic. For example, the coating 54, 55 can be a chromium layer, nickel layer, gold layer, silver layer, copper layer or the like. It is also possible to coat the entire insulating element 53.

The gap 51 or gaps 51, the insulating material 52 and/or the insulating element 53 are also suitable for thermally separating or decoupling the refrigerant lines 15, 18, 20, 21, 24, 25, the switch valves 39 to 42, the valve 19, the throttle valves 11, 32, the bypass valves 37, 38 and/or any other parts or components integrated in the refrigerant guiding block 6.

Figure 21:
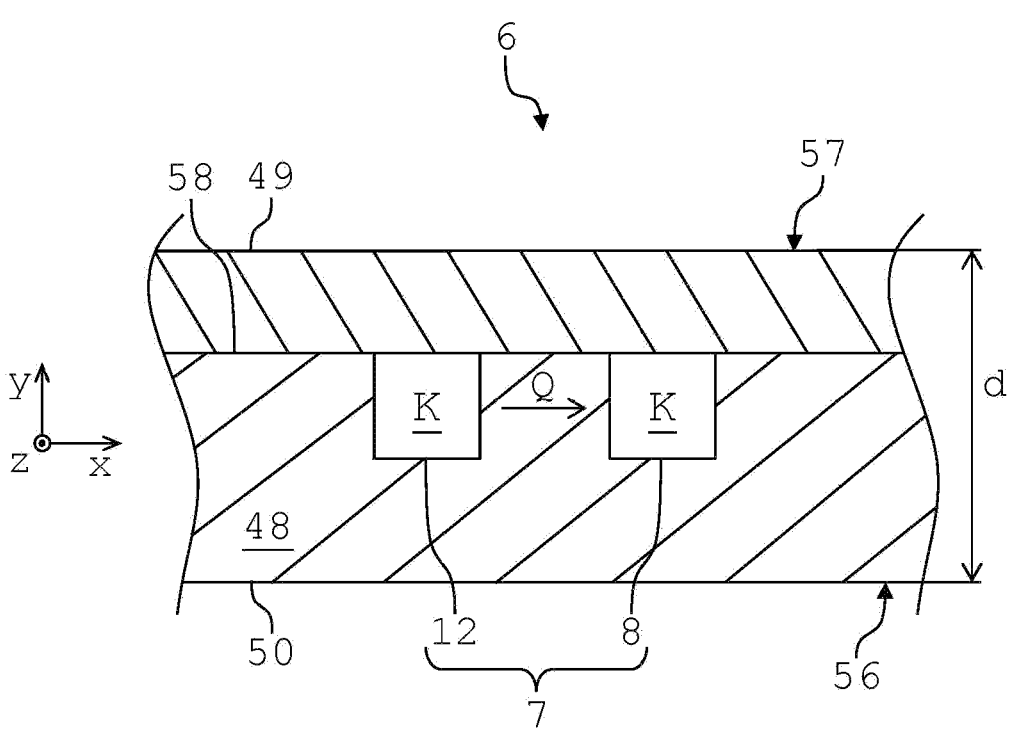
FIG. 21 shows a schematic detailed sectional view of another embodiment of a refrigerant guiding block according to section line XVII-XVII of FIG. 1.

FIG. 21 shows a schematic detailed sectional view of another embodiment of a refrigerant guiding block 6 for the previously explained embodiments of the heating and cooling module 4A to 4P. In contrast to the embodiments of the refrigerant guiding block 6 according to FIGS. 17 to 20, however, the refrigerant guiding block 6 is not made in one piece, but in multiple pieces.

The refrigerant guiding block 6 comprises a lower part 56 and an upper part 57, which are connected to each other in a fluid-tight manner at an interface 58. The interface 58 may be a solder joint or weld joint. The interface 58 may also be an adhesive interface. The upper part 57 may be a cover that closes a maintenance opening, for example. The lower part 56 and the upper part 57 are preferably made of the same material 48.

In the present case, the refrigerant lines 8, 12 are integrated as channels into the lower part 56, for example with the aid of a milling process. The refrigerant lines 8, 12 therefore have a rectangular cross-section. In principle, however, the cross-sectional shape of the refrigerant lines 8, 12 is arbitrary. In the orientation of FIG. 21, the refrigerant lines 8, 12 are sealed fluid-tightly at the top by the upper part 57.

The separation into lower part 56 and upper part 57 advantageously also allows larger components, such as the heat exchangers 22, 26, in particular heat exchanger plates of the heat exchangers 22, 26, or the compressor 29 to be integrated into the refrigerant guiding block 6.

Concerning the refrigerant guiding block 6 according to FIG. 21, the previous explanations apply accordingly with regard to the refrigerant guiding block 6 according to FIG. 17. This applies in particular with regard to the previously mentioned transfer of heat Q between the refrigerant lines 8, 12.

Figure 22:
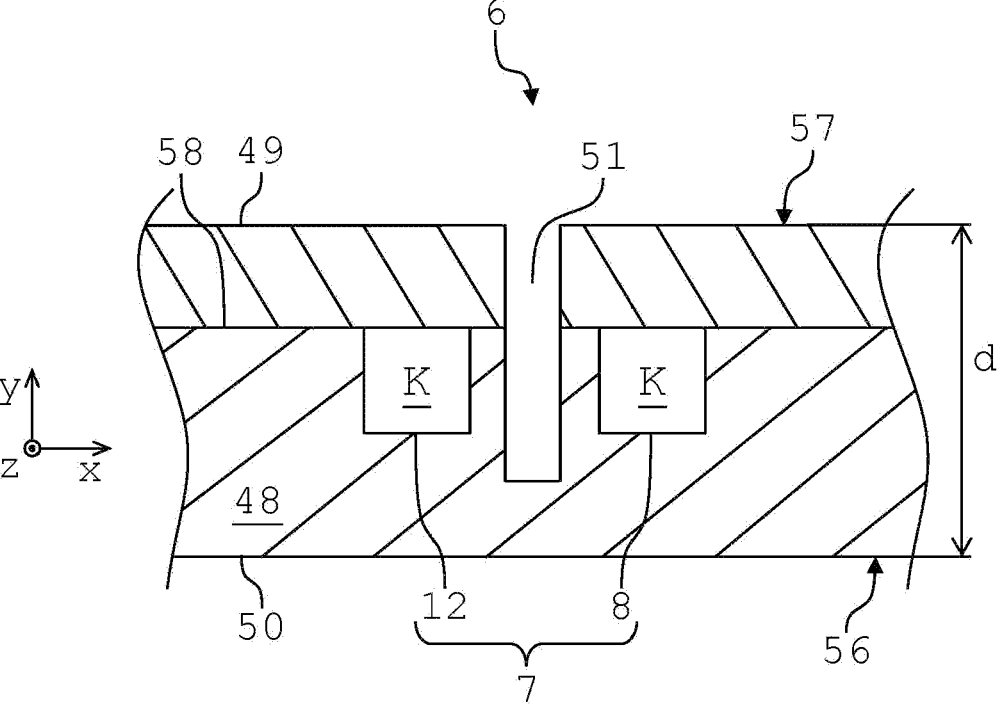
FIG. 22 shows a schematic detailed sectional view of another embodiment of a refrigerant guiding block according to section line XVII-XVII of FIG. 1.

FIG. 22 shows a schematic detailed sectional view of another embodiment of a refrigerant guiding block 6 in which, as in the case of the refrigerant guiding block 6 according to FIG. 18, a thermal separation is implemented between the refrigerant lines 8, 12, which prevents or at least reduces a transfer of heat Q between the refrigerant lines 8, 12.

For this purpose, a gap 51 is provided as previously mentioned, which is worked into the material 48 of the refrigerant guiding block 6, for example milled into it. The gap 51 can extend through the upper part 57 and the lower part 56. However, the gap 51 may also be provided only in the lower part 56, so that the upper part 57 closes the gap 51 upwardly in the orientation of FIG. 22. Otherwise, the gap 51 corresponds in its structure and function to the gap 51 explained with reference to FIG. 18.

Figure 23:
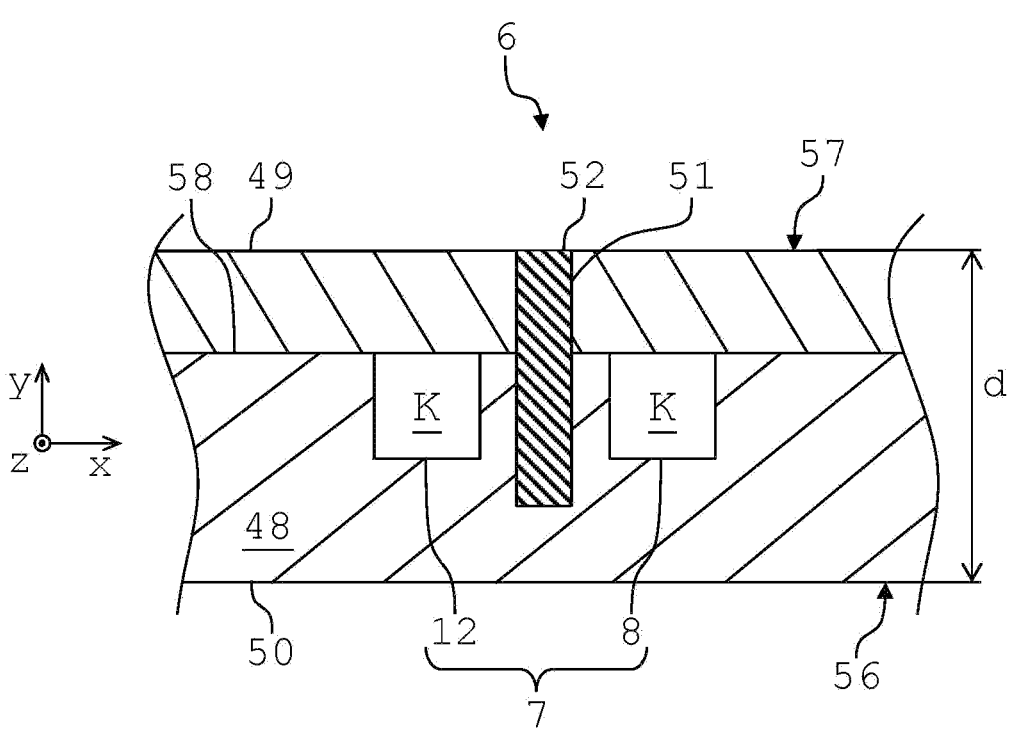
FIG. 23 shows a schematic detailed sectional view of another embodiment of a refrigerant guiding block according to section line XVII-XVII of FIG. 1.

FIG. 23 shows a schematic detailed sectional view of another embodiment of a refrigerant guiding block 6 in which, compared to the refrigerant guiding block according to FIG. 22, a further improved thermal separation between the refrigerant lines 8, 12 is realized.

For this purpose, the gap 51 is at least partially, but preferably completely, filled with an insulating material 52. The insulating material 52 can be, for example, a polyurethane foam (PU), which is introduced in liquid form into the gap 51, where it foams up and hardens and/or cross-links. Preferably, the insulating material 52 is a foam or comprises pores that may be closed or open. The insulating material 52 may also be an injection molded plastic component that is bonded and/or inserted into the gap 51.

The upper part 57 may cover the insulating material 52, in the case where the gap 51 does not pass through the upper part 57, on the upper side in the orientation of FIG. 23. The insulating material 52 may thus be completely surrounded or enclosed by the material 48 of the refrigerant guiding block 6.

Figure 24:
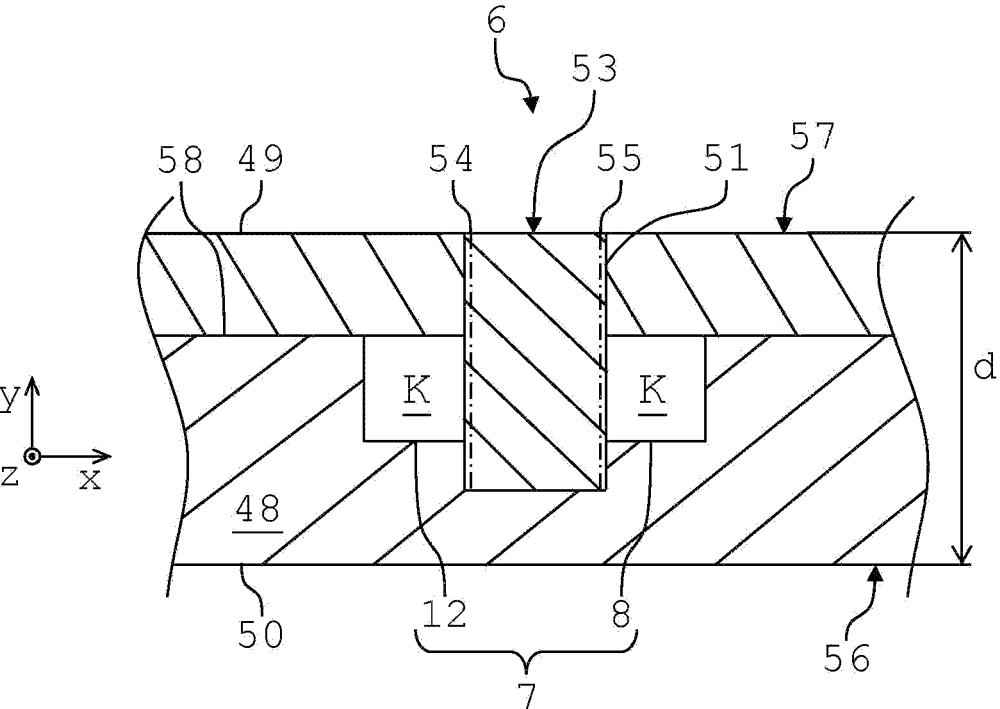
FIG. 24 shows a schematic detailed sectional view of another embodiment of a refrigerant guiding block according to section line XVII-XVII of FIG. 1.

FIG. 24 shows a schematic detailed sectional view of another embodiment of a refrigerant guiding block 6 in which, compared to the refrigerant guiding block 6 according to FIG. 23, a further improved thermal separation between the refrigerant lines 8, 12 is realized.

In this embodiment of the refrigerant guiding block 6, the gap 51 is so wide that it intersects refrigerant lines 8, 12. This means that the refrigerant lines 8, 12 are at least partially open or open at their circumference or laterally towards the gap 51, so that the refrigerant K can flow into the gap 51.

In order to seal the refrigerant lines 8, 12 fluid-tightly with respect to the gap 51 and at the same time to achieve thermal separation of the refrigerant lines 8, 12 as mentioned above, an insulating element 53 is accommodated in the gap 51. The insulating element 53 comprises a coating 54, 55 as mentioned before. The insulating element 53 may be glued or welded into the gap 51. Otherwise, the insulating element 53 corresponds in its structure and function to the insulating element 53 explained with reference to FIG. 20.

The embodiments of the refrigerant guiding block 6 according to FIGS. 17 to 20 and the embodiments of the refrigerant guiding block 6 according to FIGS. 21 to 24 can be combined as desired. For example, in the region of the refrigerant lines 8, 12, the refrigerant guiding block 6 can be designed integral, in particular in one piece of material, whereas in the region of the switch valves 39 to 42, for example, the refrigerant guiding block 6 is designed in two parts with a lower part 56 and an upper part 57 in order to allow good accessibility to the switch valves 39 to 42. The upper part 57 can also be a removable maintenance cover.

The embodiments regarding the thermal separation or decoupling of the refrigerant lines 8, 12 by means of the gap 51, the insulating material 52 and/or the insulating element 53 are correspondingly applicable to any other components or parts of the refrigerant circuit 7 integrated in the refrigerant guiding block 6.

These aforementioned components or parts may include the refrigerant lines 8, 12, 15, 18, 20, 21, 24, 25, the valve 19, the compressor 29, the throttle valves 11, 32, the bypass valves 37, 38, the switch valves 39 to 42, the recycling unit 44, the switch valve unit 45, the heat exchangers 22, 26, 43 and/or any other components of the refrigerant circuit 7. The aforementioned components may therefore also be referred to as "components" of the refrigerant circuit 7. For example, an annular gap 51 may be provided to extend around a component to be thermally decoupled.

Figure 25:
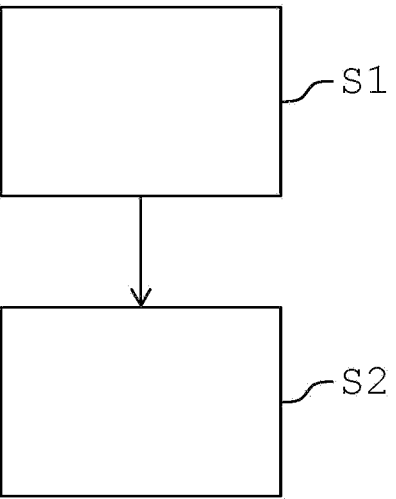
FIG. 25 shows a schematic block diagram of an embodiment of a method for operating a heating and cooling module for a heating and cooling system according to any of FIGS. 1 to 16.

FIG. 25 shows a schematic block diagram of one embodiment of a method for operating a heating and cooling module 4A to 4P for a heating and cooling system 1A to 1P, as explained previously. The method can be used for air conditioning the interior 3 of the building 2 or for air conditioning an interior of a vehicle, in particular a motor vehicle.

In a step S1, the refrigerant K is passed through the refrigerant circuit 7 of the respective heating and cooling module 4A to 4P. Thereby, at least a part of the refrigerant circuit 7 is integrated into the material 48 from which the refrigerant guiding block 6 is made. That is, in the step S1, the refrigerant K flows directly through the refrigerant guiding block 6, for example through the refrigerant lines 8, 12, 15, 18, 20, 21, 24, 25 and/or through other components of the refrigerant circuit 7.

With the aid of the refrigerant K, heat Q is transferred in a step S2. The heat Q can be transferred, for example, from the surroundings 5 to the interior 3 or vice versa. In the heating mode, the heat Q is transferred from the surroundings 5 to the interior 3. In the cooling mode, the heat Q is transferred from the interior 3 to the surroundings 5. The steps S1 and S2 are preferably carried out simultaneously.

In step S1, as previously mentioned, thermal decoupling of refrigerant lines 8, 12, 15, 20, 21, 24, 25 and/or other components of the refrigerant circuit 7 provided in the refrigerant guiding block 6 can be achieved by providing at least one gap 51 in the refrigerant guiding block 6. Any number of gaps 51 of any shape may be provided. The thermal decoupling is preferably also carried out in step S2.

Although the present invention has been described with reference to examples of embodiments, it can be modified in a variety of ways.

LIST OF REFERENCE SIGNS

1A Heating and cooling system
1B Heating and cooling system
1C Heating and cooling system
1D Heating and cooling system
1E Heating and cooling system
1F Heating and cooling system
1G Heating and cooling system
1H Heating and cooling system
1I Heating and cooling system
1J Heating and cooling system
1K Heating and cooling system
1L Heating and cooling system
1M Heating and cooling system
1N Heating and cooling system
1O Heating and cooling system
1P Heating and cooling system
2 Buildings
3 Interior
4A Heating and cooling module
4B Heating and cooling module
4C Heating and cooling module
4D Heating and cooling module
4E Heating and cooling module
4F Heating and cooling module
4G Heating and cooling module
4H Heating and cooling module
4I Heating and cooling module
4J Heating and cooling module
4K Heating and cooling module
4L Heating and cooling module
4M Heating and cooling module
4N Heating and cooling module
4O Heating and cooling module
4P Heating and cooling module
5 Surroundings
6 Refrigerant guiding block
7 Refrigerant circuit
8 Refrigerant line
9 Interface
10 Interface
11 Throttle valve
12 Refrigerant line
13 Interface
14 Interface
15 Refrigerant line
16 Interface
17 Interface
18 Refrigerant line
19 Valve
20 Refrigerant line
21 Refrigerant line
22 Heat exchanger
23 Fan
24 Refrigerant line
25 Refrigerant line
26 Heat exchanger
27 Heat carrier medium circuit
28 Heat exchanger
29 Compressor
30 Compressor geometry
31 Motor 32 Throttle valve
33 Check valve
34 Check valve
35 Throttle
36 Throttle
37 Bypass valve
38 Bypass valve
39 Switch valve
40 Switch valve
41 Switch valve
42 Switch valve
43 Heat exchanger
44 Recycling unit
45 Switch valve unit
46 Heat exchanger
47 Heat carrier medium circuit
48 Material
49 Upper side
50 Bottom side
51 Gap
52 Insulating material
53 Insulation element
54 Coating
55 Coating
56 Lower part
57 Upper part
58 Interface
d Thickness
K Refrigerant
M1 Heat carrier medium
M2 Heat carrier medium
Q Heat
S1 Step
S2 Step
x x-direction
y y-direction
z z-direction

The invention claimed is:

1. A heating and cooling module for use in a heating and cooling system, comprising:
a refrigerant circuit through which a refrigerant is configured to pass, the refrigerant circuit further comprises at least one of a switch valve or a switch valve unit for reversing a flow direction of the refrigerant in the refrigerant circuit; and
a refrigerant guiding block, wherein at least part of the refrigerant circuit is integrated into a material from which the refrigerant guiding block is made, wherein the switch valve or the switch valve unit being arranged within the refrigerant guiding block and being at least partially integrated into the material.

2. The heating and cooling module according to claim 1, wherein
the refrigerant guiding block is an integral component comprising a one-piece material component.

3. The heating and cooling module according to claim 1, wherein
the refrigerant guiding block is at least in two parts comprising a lower part and an upper part which is firmly connected to the lower part.

4. The heating and cooling module according to claim 1, wherein
the refrigerant circuit further comprises a compressor which is arranged at least partially within the refrigerant guiding block.

5. The heating and cooling module according to claim 1, wherein the refrigerant circuit further comprises a throttle valve which is arranged inside the refrigerant guiding block and is at least partially integrated into the material.

6. The heating and cooling module according to claim 1, wherein the refrigerant circuit further comprises at least one heat exchanger which is arranged inside the refrigerant guiding block and is at least partially integrated into the material.

7. The heating and cooling module according to claim 1, wherein the refrigerant circuit further comprises refrigerant lines which are positioned at least partially through the refrigerant guiding block and are at least partially integrated into the material.

8. The heating and cooling module according to claim 7, wherein the refrigerant guiding block defines a gap which is integrated into the material and is positioned between refrigerant lines adjacent to one another configured to thermally decouple the refrigerant lines from one another.

9. The heating and cooling module according to claim 8, wherein the gap extends partially or completely through the refrigerant guiding block in a height direction (y) of the refrigerant guiding block.

10. The heating and cooling module according to claim 8, wherein the gap is at least partially filled with an insulating material.

11. The heating and cooling module according to claim 3, wherein the refrigerant circuit further comprises a throttle valve which is arranged inside the refrigerant guiding block and is at least partially integrated into the material.

12. The heating and cooling module according to claim 2, wherein the refrigerant circuit further comprises at least one heat exchanger which is arranged inside the refrigerant guiding block and is at least partially integrated into the material.

13. The heating and cooling module according to claim 1, wherein the refrigerant circuit further comprises refrigerant lines which are positioned at least partially through the refrigerant guiding block and are at least partially integrated into the material.

14. A method for operating a heating and cooling module for use in a heating and cooling system, comprising:

providing a refrigerant guiding block formed from a solid metallic material forming at least a part of a refrigerant circuit of the heating and cooling module;

passing a refrigerant through the refrigerant circuit, so that the refrigerant flows through the refrigerant guiding block; and transferring heat by the refrigerant, wherein the refrigerant guiding block includes an upper side and a lower side wherein refrigerant lines of the refrigerant circuit are formed in the refrigerant guiding block, the method further comprising thermal decoupling of refrigerant lines by at least one gap extending into the refrigerant guiding block from one of the upper side or the lower side in a direction away from the upper side or the lower side, respectively, of the refrigerant guiding block between the refrigerant lines positioned adjacent to one another.

15. A heating and cooling module for use in a heating and cooling system, comprising:

a refrigerant circuit through which a refrigerant is configured to pass; and a refrigerant guiding block, wherein at least part of the refrigerant circuit is integrated into a material from which the refrigerant guiding block is made, wherein the refrigerant circuit further comprises refrigerant lines which are positioned at least partially through the refrigerant guiding block and are at least partially integrated into the material, wherein the refrigerant guiding block defines a gap which is integrated into the material and is positioned between refrigerant lines that are adjacent to one another and configured to thermally decouple the refrigerant lines from one another, wherein at least one of the refrigerant lines is opened towards and in communication with the gap, wherein an insulating element is positioned within the gap and is configured to fluid-tightly seal the at least one refrigerant line in communication with the gap with respect to the gap.

16. The heating and cooling module according to claim 15, wherein the insulating element comprises a diffusion-tight coating at least on a refrigerant side in communication with the refrigerant.

17. The heating and cooling module according to claim 16, wherein the diffusion-tight coating comprises a metallic coating.

* * * * *